(12) United States Patent
Abrams

(10) Patent No.: US 8,206,800 B2
(45) Date of Patent: Jun. 26, 2012

(54) FLOCKED ADHESIVE ARTICLE HAVING MULTI-COMPONENT ADHESIVE FILM

(76) Inventor: Louis Brown Abrams, Fort Collins, CO (US)

( * ) Notice: Subject to any disclaimer, the term of this patent is extended or adjusted under 35 U.S.C. 154(b) by 937 days.

(21) Appl. No.: 11/934,668

(22) Filed: Nov. 2, 2007

(65) Prior Publication Data

US 2008/0124503 A1    May 29, 2008

Related U.S. Application Data

(60) Provisional application No. 60/864,107, filed on Nov. 2, 2006.

(51) Int. Cl.
  *B32B 9/00* (2006.01)
  *B32B 33/00* (2006.01)
  *B32B 7/12* (2006.01)
  *B32B 15/04* (2006.01)
  *B05D 1/14* (2006.01)
  *B05D 1/16* (2006.01)

(52) U.S. Cl. .......... 428/40.1; 428/41.9; 428/85; 428/90; 428/91; 428/96; 428/97; 428/343; 428/346; 427/197; 427/200; 427/202; 427/206

(58) Field of Classification Search ............ 428/40.1, 428/41.9, 85, 90, 91, 96, 97, 343–346, 353; 427/197, 200, 202, 206, 462–464
See application file for complete search history.

(56) References Cited

U.S. PATENT DOCUMENTS

| | | | |
|---|---|---|---|
| 1,580,717 A | 4/1926 | Flick | |
| 1,975,542 A | 10/1934 | Forsdale | |
| 1,992,676 A | 2/1935 | Schwarz | |
| 2,047,978 A | 7/1936 | MacLaurin | |
| 2,230,654 A | 2/1941 | Plunkett | |
| 2,275,617 A | 3/1942 | Duerr et al. | |
| 2,278,227 A | 3/1942 | Thackeray et al. | |
| 2,477,912 A | 8/1949 | Vallandigham | |
| 2,592,602 A | 4/1952 | Saks | |
| 2,636,837 A | 4/1953 | Summers | |
| 2,835,576 A | 5/1958 | Ensink | |
| 2,916,403 A | 12/1959 | Calderwood | |
| 2,981,588 A | 4/1961 | Hyman | |
| 2,999,763 A | 9/1961 | Sommer | |
| 3,099,514 A | 7/1963 | Haber | |
| 3,215,584 A | 11/1965 | McConnell et al. | |
| 3,351,479 A | 11/1967 | Fairchild | |
| 3,377,232 A | 4/1968 | Mencock et al. | |
| 3,411,156 A | 11/1968 | Feher | |
| 3,432,446 A | 3/1969 | Coppeta | |
| 3,459,579 A | 8/1969 | Newman | |
| 3,496,054 A | 2/1970 | Baigas | |

(Continued)

FOREIGN PATENT DOCUMENTS

AU    606651    2/1991

(Continued)

OTHER PUBLICATIONS

"Vestamelt", Degussa AG, date unknown, pp. 1-4.

(Continued)

*Primary Examiner* — Patricia Nordmeyer
(74) *Attorney, Agent, or Firm* — Sheridan Ross, PC

(57) ABSTRACT

A design and process are provided in which a fully activated thermosetting adhesive layer and multi-layered thermoplastic adhesive are positioned between a flock layer and a substrate.

26 Claims, 8 Drawing Sheets

U.S. PATENT DOCUMENTS

| | | |
|---|---|---|
| 3,529,986 A | 9/1970 | Kappas et al. |
| 3,565,742 A | 2/1971 | Stephens et al. |
| 3,591,401 A | 7/1971 | Snyder et al. |
| 3,639,149 A | 2/1972 | Spalding |
| 3,644,267 A | 2/1972 | Jackson, Jr. et al. |
| 3,660,200 A | 5/1972 | Anderson et al. |
| 3,674,611 A | 7/1972 | Petry et al. |
| 3,772,132 A | 11/1973 | Dulin, Jr. |
| 3,775,205 A | 11/1973 | Hermann et al. |
| 3,793,050 A | 2/1974 | Mumpower, Jr. |
| 3,887,737 A | 6/1975 | Baxter et al. |
| 3,903,331 A | 9/1975 | Klein |
| 3,917,883 A | 11/1975 | Jepson |
| 3,918,895 A | 11/1975 | Mizuno |
| 3,928,706 A | 12/1975 | Gibbons |
| 3,936,554 A | 2/1976 | Squier |
| 3,953,566 A | 4/1976 | Gore |
| 3,956,552 A | 5/1976 | Geary |
| 3,961,116 A | 6/1976 | Klein |
| 3,979,538 A | 9/1976 | Gilman et al. |
| 4,018,956 A | 4/1977 | Casey |
| 4,025,678 A | 5/1977 | Frank |
| 4,031,281 A | 6/1977 | Keeling |
| 4,034,134 A | 7/1977 | Gregorian et al. |
| 4,035,532 A | 7/1977 | Gregorian et al. |
| 4,062,992 A | 12/1977 | Power et al. |
| 4,088,708 A | 5/1978 | Riew |
| 4,142,929 A | 3/1979 | Otomine et al. |
| 4,201,810 A | 5/1980 | Higashiguchi |
| 4,218,501 A | 8/1980 | Kameya et al. |
| 4,238,190 A | 12/1980 | Rejto |
| 4,251,427 A | 2/1981 | Recker et al. |
| 4,263,373 A | 4/1981 | Mccaskey et al. |
| 4,269,885 A | 5/1981 | Mahn |
| 4,273,817 A | 6/1981 | Matsuo et al. |
| 4,282,278 A | 8/1981 | Higashiguchi |
| 4,292,100 A | 9/1981 | Higashiguchi |
| 4,294,577 A | 10/1981 | Bernard |
| 4,308,296 A | 12/1981 | Chitouras |
| 4,314,813 A | 2/1982 | Masaki |
| 4,319,942 A | 3/1982 | Brenner |
| 4,340,632 A | 7/1982 | Wells et al. |
| 4,362,773 A | 12/1982 | Shikinami |
| 4,368,231 A | 1/1983 | Egert et al. |
| 4,370,374 A | 1/1983 | Raabe et al. |
| 4,385,093 A | 5/1983 | Hubis |
| 4,385,588 A | 5/1983 | Bennetot |
| 4,390,387 A | 6/1983 | Mahn |
| 4,396,662 A | 8/1983 | Higashiguchi |
| 4,413,019 A | 11/1983 | Brenner |
| 4,418,106 A | 11/1983 | Landler et al. |
| 4,430,372 A | 2/1984 | Knoke et al. |
| 4,438,533 A | 3/1984 | Hefele |
| 4,465,723 A | 8/1984 | Knoke et al. |
| 4,574,018 A | 3/1986 | Masuda et al. |
| 4,588,629 A | 5/1986 | Taylor |
| 4,610,904 A | 9/1986 | Mahn, Sr. et al. |
| 4,652,478 A | 3/1987 | Maii |
| 4,668,323 A | 5/1987 | Lenards et al. |
| 4,681,791 A | 7/1987 | Shibahashi et al. |
| 4,687,527 A | 8/1987 | Higashiguchi |
| 4,693,771 A | 9/1987 | Payet et al. |
| 4,741,791 A | 5/1988 | Howard et al. |
| 4,810,549 A | 3/1989 | Abrams et al. |
| 4,895,748 A | 1/1990 | Squires |
| 4,923,848 A | 5/1990 | Akada et al. |
| 4,931,125 A | 6/1990 | Volkmann et al. |
| 4,937,115 A | 6/1990 | Leatherman |
| 4,961,896 A | 10/1990 | Constantino |
| 4,966,801 A | 10/1990 | Becker et al. |
| 4,980,216 A | 12/1990 | Rompp |
| 4,985,296 A | 1/1991 | Mortimer, Jr. |
| 5,008,130 A | 4/1991 | Lenards |
| 5,009,943 A | 4/1991 | Stahl |
| 5,009,950 A | 4/1991 | Wagner et al. |
| 5,041,104 A | 8/1991 | Seal |
| 5,047,103 A | 9/1991 | Abrams et al. |
| 5,110,670 A | 5/1992 | Janocha et al. |
| 5,112,423 A | 5/1992 | Liebe, Jr. |
| 5,115,104 A | 5/1992 | Bunyan |
| 5,126,182 A | 6/1992 | Lumb et al. |
| 5,155,163 A | 10/1992 | Abeywardena et al. |
| 5,198,277 A | 3/1993 | Hamilton et al. |
| 5,207,851 A | 5/1993 | Abrams |
| 5,248,536 A | 9/1993 | Du Katz |
| 5,298,031 A | 3/1994 | Gabay et al. |
| 5,312,576 A | 5/1994 | Swei et al. |
| 5,338,603 A | 8/1994 | Mahn et al. |
| 5,346,746 A | 9/1994 | Abrams |
| 5,383,996 A | 1/1995 | Dressler |
| 5,385,694 A | 1/1995 | Wu et al. |
| 5,403,884 A | 4/1995 | Perlinski |
| 5,411,783 A | 5/1995 | Mahn, Jr. |
| 5,413,841 A | 5/1995 | Mahn et al. |
| 5,480,506 A | 1/1996 | Mahn, Sr. et al. |
| 5,529,650 A | 6/1996 | Bowers et al. |
| 5,543,195 A | 8/1996 | Squires et al. |
| 5,597,633 A | 1/1997 | Mecke et al. |
| 5,597,637 A | 1/1997 | Abrams et al. |
| 5,658,630 A | 8/1997 | Shizukuda et al. |
| 5,665,458 A | 9/1997 | Mahn, Jr. |
| 5,681,420 A | 10/1997 | Yamane |
| 5,685,223 A | 11/1997 | Vermuelen et al. |
| D391,572 S | 3/1998 | Lee |
| 5,756,180 A | 5/1998 | Squires et al. |
| 5,766,397 A | 6/1998 | Jones |
| 5,851,617 A | 12/1998 | Keiser |
| 5,858,156 A | 1/1999 | Abrams et al. |
| 5,863,633 A | 1/1999 | Squires et al. |
| 5,866,248 A | 2/1999 | Dressler |
| 5,914,176 A | 6/1999 | Myers |
| 5,981,021 A | 11/1999 | McCulloch |
| 6,010,764 A | 1/2000 | Abrams |
| 6,025,068 A | 2/2000 | Pekala |
| 6,083,332 A | 7/2000 | Abrams |
| 6,110,560 A | 8/2000 | Abrams |
| 6,178,680 B1 | 1/2001 | Sloot |
| 6,224,707 B1 | 5/2001 | Lion |
| 6,247,215 B1 | 6/2001 | Van Alboom et al. |
| 6,264,775 B1 | 7/2001 | Holeschovsky et al. |
| 6,361,855 B2 | 3/2002 | Mahn, Jr. et al. |
| 6,436,506 B1 | 8/2002 | Pinter et al. |
| 6,555,648 B1 | 4/2003 | Hinds |
| 6,569,538 B1 | 5/2003 | Kaschel |
| 6,676,796 B2 | 1/2004 | Pinter et al. |
| 6,774,067 B2 | 8/2004 | Demott et al. |
| 6,841,240 B2 | 1/2005 | Gorny et al. |
| 6,924,000 B2 | 8/2005 | Tallmadge |
| 6,929,771 B1 | 8/2005 | Abrams |
| 6,977,023 B2 | 12/2005 | Abrams |
| 7,135,518 B2 | 11/2006 | Bandou et al. |
| 7,191,720 B2 | 3/2007 | Thomas |
| 7,229,680 B1 | 6/2007 | Crompton |
| 7,393,516 B2 | 7/2008 | Seo et al. |
| 7,410,932 B2 | 8/2008 | Figueroa |
| 7,461,444 B2 | 12/2008 | Deaett et al. |
| 7,465,485 B2 * | 12/2008 | Abrams ............... 428/90 |
| 2001/0008672 A1 | 7/2001 | Norvell et al. |
| 2002/0009571 A1 | 1/2002 | Abrams |
| 2002/0098329 A1 | 7/2002 | Abrams |
| 2003/0129353 A1 | 7/2003 | Abrams |
| 2003/0186019 A1 | 10/2003 | Abrams |
| 2003/0207072 A1 | 11/2003 | Abrams |
| 2003/0211279 A1 | 11/2003 | Abrams |
| 2004/0010093 A1 | 1/2004 | Wefringhaus et al. |
| 2004/0033334 A1 | 2/2004 | Merovitz |
| 2004/0050482 A1 | 3/2004 | Abrams |
| 2004/0053001 A1 | 3/2004 | Abrams |
| 2004/0055692 A1 | 3/2004 | Abrams |
| 2004/0058120 A1 | 3/2004 | Abrams |
| 2004/0081791 A1 | 4/2004 | Abrams |
| 2004/0170799 A1 | 9/2004 | Carr et al. |
| 2004/0180592 A1 | 9/2004 | Ray |
| 2005/0081985 A1 | 4/2005 | Abrams |
| 2005/0158508 A1 | 7/2005 | Abrams |
| 2005/0188447 A1 | 9/2005 | Gray |
| 2005/0260378 A1 | 11/2005 | Bernabeu |

| | | | |
|---|---|---|---|
| 2005/0266204 A1 | 12/2005 | Abrams | |
| 2005/0268407 A1 | 12/2005 | Abrams | |
| 2006/0026778 A1 | 2/2006 | Lion | |
| 2006/0029767 A1 | 2/2006 | Lion | |
| 2006/0142405 A1 | 6/2006 | Kijima | |
| 2006/0150300 A1 | 7/2006 | Hassan et al. | |
| 2006/0160943 A1 | 7/2006 | Weir | |
| 2006/0251852 A1 | 11/2006 | Abrams | |
| 2006/0257618 A1 | 11/2006 | Pascual Bernabeu | |
| 2007/0022548 A1 | 2/2007 | Abrams | |
| 2007/0026189 A1 | 2/2007 | Abrams | |
| 2007/0102093 A1 | 5/2007 | Abrams | |
| 2007/0110949 A1 | 5/2007 | Abrams | |
| 2007/0148397 A1 | 6/2007 | Abrams | |
| 2007/0219073 A1 | 9/2007 | Mannschedel | |
| 2008/0003394 A1 | 1/2008 | Eke | |
| 2008/0113144 A1 | 5/2008 | Abrams | |
| 2008/0187706 A1 | 8/2008 | Lion et al. | |
| 2008/0299397 A1 | 12/2008 | Kenens et al. | |
| 2009/0280290 A1 | 11/2009 | Weedlun | |
| 2010/0178445 A1 | 7/2010 | Shen et al. | |

FOREIGN PATENT DOCUMENTS

| | | |
|---|---|---|
| AU | 653994 | 10/1994 |
| CA | 757595 | 4/1967 |
| CA | 2010076 | 8/1990 |
| CA | 1306411 | 8/1992 |
| CA | 2064300 | 9/1992 |
| DE | 3004560 | 8/1981 |
| DE | 202835 | 10/1983 |
| DE | 19707381 | 8/1998 |
| DE | 19734316 | 2/1999 |
| EP | 0122656 | 10/1984 |
| EP | 0210304 | 2/1987 |
| EP | 0280296 | 8/1988 |
| EP | 0351079 | 1/1990 |
| EP | 0506601 | 9/1992 |
| EP | 0685014 | 12/1995 |
| EP | 0913271 | 10/1998 |
| EP | 0989227 | 3/2000 |
| EP | 1072712 | 1/2001 |
| EP | 1557206 | 7/2005 |
| EP | 1598463 | 11/2005 |
| FR | 2442721 | 8/1980 |
| FR | 2543984 | 10/1984 |
| FR | 2659094 | 9/1991 |
| FR | 2846202 | 4/2004 |
| FR | 2881149 | 7/2006 |
| GB | 1171296 | 11/1969 |
| GB | 1466271 | 3/1977 |
| GB | 2065031 | 6/1981 |
| GB | 2101932 | 1/1983 |
| GB | 2126951 | 4/1984 |
| GB | 2214869 | 9/1989 |
| GB | 0506601 | 9/1992 |
| IE | 55104 | 10/1984 |
| JP | 71007184 | 6/1965 |
| JP | 55079143 | 6/1980 |
| JP | 55-147171 | 11/1980 |
| JP | 56058824 | 5/1981 |
| JP | 56107080 | 8/1981 |
| JP | 56108565 | 8/1981 |
| JP | 56141877 | 11/1981 |
| JP | 58062027 | 4/1983 |
| JP | S61-146368 | 7/1986 |
| JP | 62-033576 | 2/1987 |
| JP | 62-144911 | 6/1987 |
| JP | 63118544 | 5/1988 |
| JP | 64-014021 | 1/1989 |
| JP | S64-068582 | 3/1989 |
| JP | 01192538 | 8/1989 |
| JP | 01-266284 | 10/1989 |
| JP | 01-310947 | 12/1989 |
| JP | 02048076 | 2/1990 |
| JP | 04-126221 | 4/1992 |
| JP | 04-169297 | 6/1992 |
| JP | 05255021 | 10/1993 |
| JP | 06-171048 | 6/1994 |
| JP | 08-267625 | 10/1996 |
| JP | 10059790 | 3/1998 |
| JP | 10-202691 | 8/1998 |
| JP | 11-042749 | 2/1999 |
| JP | 11256484 | 9/1999 |
| JP | 11277662 | 10/1999 |
| JP | 11348159 | 12/1999 |
| JP | 2000084977 | 3/2000 |
| JP | 3076851 | 8/2000 |
| JP | 2000263673 | 9/2000 |
| JP | 2001-226885 | 8/2001 |
| JP | 2001270019 | 10/2001 |
| KR | 2003063833 | 7/2003 |
| WO | WO 89/01829 | 3/1989 |
| WO | WO 90/09289 | 8/1990 |
| WO | WO 92/04502 | 3/1992 |
| WO | WO 93/12283 | 6/1993 |
| WO | WO 94/19530 | 9/1994 |
| WO | WO 97/34507 | 9/1997 |
| WO | WO 02/07959 | 1/2002 |
| WO | WO 02/09925 | 2/2002 |
| WO | WO 02/058854 | 8/2002 |
| WO | WO 03/031083 | 4/2003 |
| WO | WO 2004/005023 | 1/2004 |
| WO | WO 2004/005600 | 1/2004 |
| WO | WO 2005/035235 | 4/2005 |
| WO | WO 2005/118948 | 12/2005 |

OTHER PUBLICATIONS

U.S. Appl. No. 12/787,938, filed May 26, 2010, Abrams.
U.S. Appl. No. 29/058,551, filed Aug. 19, 1996, Abrams.
U.S. Appl. No. 09/548,839, filed Apr. 13, 2000, Abrams.
U.S. Appl. No. 09/621,830, filed Jul. 24, 2000, Abrams.
U.S. Appl. No. 11/460,493, filed Jul. 27, 2006, Abrams.
U.S. Appl. No. 11/849,840, filed Sep. 4, 2007, Abrams.
U.S. Appl. No. 11/852,134, filed Sep. 7, 2007, Abrams.
U.S. Appl. No. 11/842,387, filed Aug. 21, 2007, Abrams.
U.S. Appl. No. 11/842,397, filed Aug. 21, 2007, Abrams.
U.S. Appl. No. 11/874,146, filed Oct. 17, 2007, Abrams.
U.S. Appl. No. 11/940,287, filed Nov. 14, 2007, Abrams.
U.S. Appl. No. 11/957,205, filed Dec. 14, 2007, Abrams.
"Bemis—Specialty Films"; available at http://www.benisworldwide.com/products/films.html; 2004; 2 pages.
"Characteristics of Commonly Used Elastomers" avaliable at http://www.deerfielddurethane.com/Deerfield-Urethane_Brochure.pdf, date unknown, 4 pages.
"Flockin' to Precision"; Images Magazine; Feb. 1992, 1 page.
"Schaetti Fix Cross Linking Test Product"; Dynamic Coating Technology; Sep. 18, 2006; 4 pages.
Bostik USA; "Automotive & Industrial Division: Web & Powder Adhesives" (2002), available at http://www.bostik.com/oem/web_adhesives.html, 2 pages.
Bostik USA; "Industrial Adhesives" (2001), 3 pages.
Bostik USA; Web & Powder Adhesives; 2000; 2 pgs.
Bostik, "Technical Data Sheet PE103 Web Adhesives", revised Feb. 7, 2006, 5 pages.
Brown Abrams, "Flocking a Touch of Velour" ScreenPrinting (Apr. 1987).
Brown Abrams, "Part II: Flocking" ScreenPrinting (Jun. 1987).
Cellusuede Products, Inc, "About Flock", Available at http://www.cellusuede.com/navabout.html, KMK Media Group, copyright 2000, 1 pages.
Cellusuede Products, Inc, "FAQ's", Available at http://www.cellusuede.com/faq.html, KMK Media Group, copyright 2000, 2 pages.
Cellusuede Products, Inc, "Fiber Types", Available at http://www.cellusuede.com/about/types.html, KMK Media Group, copyright 2000, 4 pages.
Cellusuede Products, Inc, "Glossary of Terms", Available at http://www.cellusuede.com/glossary/index.html, KMK Media Group, copyright 2000, 2 pages.
Cellusuede Products, Inc, "Uses for Flock, Home Furnishings", Available at http://www.cellusuede.com/home.html, KMK Media Group, copyright 2000, 2 pages.
Lextra® MouseRug®; "About the Product" (Jan. 27, 1999), http://www.mouserug.com/mouserug/aboutmouserugs.html, 2 pages.

Lextra® MouseRug®; "Dimensions" (Jan. 27, 1999), http://www.mouserug.com/mouserug/dimensions.html, 1 page.
Lextra® MouseRug®; "MouseRug Components" (Jan. 27, 1999), http://www.mouserug.com/mouserug/mousecomp.html, 1 page.
Sonics & Materials, Inc., "Chart II Compatability of Thermoplastics" (undated), 1 page.
Stahls', New Product Bulletin; 7 pages.
Studt et al.; "Versatality on a roll: Thermoplastic adhesive films"; Collano; Oct. 2002; 8 pages.
Declaration of L. Brown Abrams Under 37 CFR § 1.98 for U.S. Appl. No. 09/735,721 dated Jan. 16, 2004, 2 pages.
Declaration of L. Brown Abrams under 37 CFR § 1.98 for U.S. Appl. No. 09/621,830 dated Jan. 7, 2003, 2 pages.
Declaration of L. Brown Abrams under 37 CFR § 1.98 for U.S. Appl. No. 10/394,357 dated Jan. 16, 2004, 4 pages. with Appendix A-I.
Declaration of L. Brown Abrams under 37 CFR 1.132 for U.S. Appl. No. 09/735,721 dated Jan. 7, 2003.
Declaration of L. Brown Abrams Under 37 CFR 1.98 Executed Nov. 22, 2003 for U.S. Appl. No. 10/614,340, filed Jul. 3, 2003.
Declaration of L. Brown Abrams under 37 CFR § 1.98 for U.S. Appl. No. 09/621,830 dated Jan. 16, 2004, 2 pages.
Declaration of L. Brown Abrams under 37 CFR § 1.98 for U.S. Appl. No. 10/394,357 dated Jan. 3, 2007, 4 pages with Appendix A-I.
Second Supplemental Declaration of L. Brown Abrams under 37 CFR §1.132 for U.S. Appl. No. 09/548,839 executed Jan. 7, 2003.
Supplemental Declaration of L. Brown Abrams under 37 CFR § 1.132 for U.S. Appl. No. 09/548,839 executed Oct. 23, 2002.
"Door Panels Collano overcomes strain forces"; Collano AG, Switzerland, Oct. 2004; 1 page.
"Opposites Attract"; Collano AG, Switzerland, Aug. 2004; 1 page.
"PolyOne—OnFlex™-S EH Economy Grades (High Density)", PolyOne® Corporation 2007, pp. 1-2.
"PolyOne—OnFlex™-S EL Economy Grades (Low Density)", PolyOne® Corporation 2007, pp. 1-2.
"PolyOne—OnFlex™-S FG Food Contact Grades", PolyOne® Corporation 2007, pp. 1-2.
"PolyOne—OnFlex™-S KE Grades for 2K Moulding on Engineered Thermoplastics", PolyOne® Corporation 2007, pp. 1-2.
"PolyOne—OnFlex™-S Thermoplastic Elastomer Compounds", PolyOne® Corporation 2007, pp. 1-6.
"PolyOne—Synprene RT-3750", PolyOne® Corporation Feb. 9, 2010, 1 page.
U.S. Appl. No. 12/624,254, filed Nov. 23, 2009, Abrams.
U.S. Appl. No. 12/636, 421, filed Dec. 11, 2009, Abrams.
U.S. Appl. No. 12/612,524, filed Nov. 4, 2009, Abrams.
U.S. Appl. No. 12/706,622, filed Feb. 16, 2010, Abrams.
"PolyOne—OnFlex™—Styrenic Thermoplastic Elastomers", printed Feb. 9, 2010, 2 pages.
"PolyOne—Synprene RT-3790", PolyOne® Corporation Feb. 9, 2010, 1 page.
"PolyOne—Synprene RT-3850MS", PolyOne® Corporation Feb. 9, 2010, 1 page.
"PolyOne—Synprene RT-3870M", PolyOne® Corporation Feb. 9, 2010, 1 page.
"PolyOne—Synprene RT-3770", PolyOne® Corporation Feb. 9, 2010, 1 page.
"Versaflex® OM Series Material Review", TPE Tips, Issue 5, GLS Corporation Rev. Jan. 12, 2007, 2 pages.
"Versaflex® OM 3060-1—Technical Data Sheet", GLS Corporation, available at http://glscorporation.com/gls2/print.jsp?productID=182, Feb. 9, 2010, 2 pages.
U.S. Appl. No. 12/758,633, filed Apr. 12, 2010, Abrams.
"Polymers", Chemistry, Unit 16, date unknonwn, pp. 313-325.
Background of the Invention for the above-captioned application (previously provided).
U.S. Appl. No. 11/972,440, filed Jan. 10, 2008, Abrams.
U.S. Appl. No. 12/013,996, filed Jan. 14, 2008, Abrams.
U.S. Appl. No. 12/031,445, filed Feb. 14, 2008, Abrams.
U.S. Appl. No. 12/580,120, filed Oct. 15, 2009, Abrams.
Official Action for U.S. Appl. No. 12/636,421, mailed Apr. 13, 2011.
U.S. Appl. No. 12/397,946, filed Mar. 4, 2009, Abrams.
Bright, Larry. "Trouble Shooting Continuous Thermosol Dyeing of Polyester Fiber and Blends". American Dyestuff Reporter, Aug. 1996, pp. 60-61.
Official Action (Restriction Requirement) for U.S. Appl. No. 12/636,421, mailed Jan. 4, 2011.
"Adhesives for Decorative Apparel for High Quality Embroidered Emblems, Patches, and Sports Lettering," Bemis, Feb. 2002, 2 pages.
"Ex Tech™ Extruded Technical Film Solutions," Bemis, Sep. 2006, 6 pages.
"General Guidelines for Using Heat Seal Film Adhesives in Embroidery Applications," Bemis Associates, Shirley, MA, revised Feb. 2000, 8 pages.
"Sewfree® Adhesive Film & Tape," Bemis, Jul. 2006, 4 pages.
Notice of Allowance for U.S. Appl. No. 12/636,421, mailed Aug. 15, 2011.

* cited by examiner

FLOCKED ADHESIVE ARTICLE HAVING MULTI-COMPONENT ADHESIVE FILM

CROSS-PREFERENCE TO RELATED APPLICATIONS

The presented application claims benefit of U.S. Provisional Patent Application Ser. No. 60/864,107, filed Nov. 2, 2006, to Abrams and is incorporated fully herein by this reference.

FIELD OF THE INVENTION

The invention relates generally to flocked articles and particularly to flocked decorative articles having a multi-component adhesive film. More specifically the invention relates to flocked decorative articles having non-compatible heat sealed materials.

BACKGROUND OF THE INVENTION

Flocked decorative articles are used in a wide variety of applications. For example, flocked articles are used as patches, transfers, coated molded objects, and the like. Flock applied to a decorative article can enhance the texture and perceived value of the decorative article. To maintain a high level of plushness of the decorative flocked article, it is important to not only to permanently anchor the flock fibers in a substantially perpendicular orientation of the flocks fibers relative to the substrate and it is also important to provide space between the fibers so that fibers can move freely to create a feeling of plushness.

One technique for accomplishing these objectives, permanently adhering the flock in a substantially perpendicular orientation to the substrate and providing substantially free movement of the flock fibers, is embedding the flock fibers in pre-formed, self-supporting (A- or B-staged) thermosetting adhesive film and fully activating (that is, cross-linking or C-staging) the thermosetting adhesive to permanently adhere the flock fibers to the thermoset adhesive. Once fully cross-linked, the thermoset adhesive is no longer capable of being adhered to another material. A problem thus exists in the need of a downstream user to adhere the fully cross-linked thermoset adhesive to a substrate.

SUMMARY OF THE INVENTION

These and other needs are addressed by the various embodiments and configurations of the present invention. The present invention is directed generally to an article having adjacent thermosetting and thermoplastic adhesive layers arranged so that the thermosetting adhesive layer is between the flock and thermoplastic adhesive layer. The thermoplastic adhesive layer is a laminate or co-extruded film having multiple, typically incompatible, components. In one application, a first part or layer of the thermoplastic adhesive has, as its primary component, a first polymer, which is typically polar, and a second part or layer of the thermoplastic layer has, as its primary component, a second polymer, which is different from the first polymer and is typically non-polar. As used herein, "compatibility" refers to physical or chemical incompatibility; that is, two materials are considered to be incompatible if they will not typically adhere directly to one another unless formed and/or processed in intimate association or in conjunction with one another. For example, polyesters and polyolefins are generally chemically incompatible, as for example due to differing polarities; however, they can be adhered to or associated with one another by suitable processing techniques, such as co-extrusion or lamination.

The first and second parts can be formulated to have one or more differing properties. By way of example, the first and second parts may have one or more differing melting temperatures, softening points, viscosities, surface energies, solubility parameters, degree of crystallinity, hydrogen bonding properties, morphologies, chemical properties, physical properties, structural properties, and bond strengths. The first and second parts are preferably selected such that the first and second parts are capable of being adhered to or associated with one another by co-extrusion, lamination, or other processing techniques, and that the first part is capable of being adhered to or associated with a first material, such as a polar substrate, and the second part is capable of being adhered to or associated with a second material, such as a non-polar substrate. Preferably, the first and second parts do not flow together when the co-extruded film is softened or melted.

While not wishing to be bound by any theory, the inability of thermosetting adhesives to bond to certain types of substrates is believed to be due to chemical and/or physical differences between the thermosetting adhesive and substrate, which provide for poor adhesion of the thermosetting adhesive to the substrate. As for example, it is hard to realize an adhesive joining of the materials when materials, such as polar and non-polar substrates, have little, if any, affinity for one another.

In one embodiment, the thermosetting adhesive layer is contacted with the flock fibers and fully thermoset before contact with the thermoplastic adhesive layer. It has been discovered that, when the two adhesive layers are applied simultaneously or substantially simultaneously to the flock layer both adhesive layers can set irreversibly, even when one of the adhesive layers is a thermoplastic adhesive layer. While not wishing to be bound by any theory, the irreversible setting of the two adhesive layers is believed to be due to thermosetting curing agents migrating into the thermoplastic adhesive layer causing it to cross-link in same manner as the thermosetting adhesive layer. It has been found that applying and laminating the adhesive layers separately at differing times can solve this problem, for example, by completely curing (C-staging) the thermosetting adhesive layer before applying the thermoplastic layer immobilizes (and/or consumes) the curing agents in thermosetting adhesive layer thereby, preventing migration of the cross-linking agents into the thermoplastic adhesive layer. The fully cross-linked thermoset adhesive also can provide a barrier to inhibit flow of another adhesive, used to adhere the flock to a substrate, flowing between and/or up the longitudinal axis of the flock fibers.

In another embodiment, the thermoplastic adhesive layer is softened or at least partially liquefied and applied to the fully activated (or cross-linked) thermosetting adhesive layer firmly adhered to the flock fibers. The fully cross-linked thermosetting adhesive inhibits the flow of the softened or liquefied thermoplastic adhesive, during bonding application of the thermoplastic adhesive, into and between the flock fibers, thereby maintaining a high degree of plushness in the flock layer without compromising the bond strength between the fibers and thermosetting adhesive layer.

Yet another embodiment of the present invention includes the use of a multi-component adhesive film to adhesively bond normally incompatible surfaces, such as polar and non-polar surfaces. The ability to adhesively join non-compatible materials can permit the manufacturing of a wide variety of flocked articles, such as for example adhesively joining flock labels to natural rubber Harmony™ yoga mats from Jade Industries, or adhesively joining a flock transfer to natural rubber MOUSE RUG™ manufactured by Fiberlok® Inc. Multi-component adhesive films permit several steps to be performed simultaneously, e.g., gluing and finishing in a single step. Because the multi-component film can be in the form a pre-formed and self-supporting film prior to use, the film can be easy to handle, and the manufacturing process can be clean and environmentally friendly, as opposed to liquid adhesives. The thermoplastic adhesive film can also be three-dimensionally deep-drawn and thermoformed.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The above-described embodiments and configurations are neither complete nor exhaustive. As will be appreciated, other embodiments of the invention, are possible utilizing, alone or in combination, one or more of the features set forth above or described in detail below.

DETAILED DESCRIPTION

Figure 1:
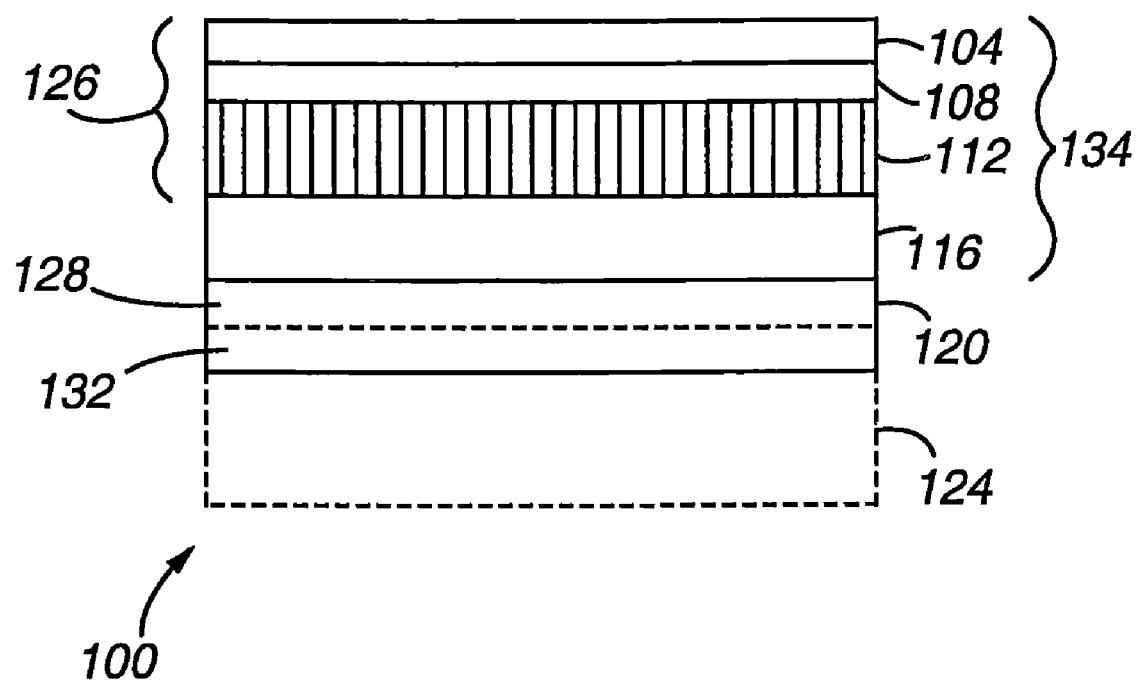
FIG. 1 is a side view of a flocked article produced according to an embodiment of the present invention.

FIG. 1 shows a flocked article 100 according to an embodiment of the present invention. The article 100 includes a carrier sheet 104, release adhesive layer 108, flock layer 112 having a plurality of flock fibers, thermosetting adhesive layer 116, thermoplastic adhesive layer 120, and optional substrate 124. As can be seen from FIG. 1, the flock fibers in the flock layer 112 are substantially parallel to one another along their length and are substantially perpendicular to the planes of the carrier sheet 104 and adhesive layers 116 and 120 to provide a plush feel.

The release or carrier sheet 104 can be any material that is dimensionally stable under the temperatures and pressures encountered during the manufacturing process. The carrier 104 can be any low-cost, dimensionally stable substrate, such as paper, plastic film, and the like, preferably in the form of a discontinuous sheet or a running web line material (such as described in U.S. Pat. No. 6,025,068 and copending U.S. Provisional Application Ser. Nos. 60/628,836, filed Nov. 16, 2005, 60/676,124, filed Apr. 28, 2005, 60/703,925, filed Jul. 28, 2005, 60/704,681, filed Aug. 1, 2005, 60/707,577, filed Aug. 11, 2005, 60/710,368, filed Aug. 22, 2005, 60/716,869, filed Sep. 13, 2005, 60/719,469, filed Sep. 21, 2005, and 60/719,098, filed Sep. 20, 2005, to Abrams), and other known carriers. The carrier sheet 104 is preferably a porous film, such as a porous film coated with release adhesive 108, which is preferably a water-based release adhesive. A preferred porous film is discussed by Pekala in U.S. Pat. No. 6,025,068. A particularly preferred porous film is sold by PPG Industries Inc. under the trade name TESLIN™. Battery separator membranes can also be used. Examples include Daramic Industrial CL™ sold by Daramic, Inc., and the uncoated, nono-layer, highly filled polyolefin sheet battery separator membranes sold by Celgard or by Daramic, Inc. under the trade name Artisyn™. Typically, but not always, the carrier is a discontinuous as opposed to a continuous sheet on a running web line.

The release adhesive 108 can be any adhesive that adheres more strongly to the carrier sheet than the flock fibers but adheres to both enough to hold them together. For example, the release adhesive 108 can be any temporary adhesive, such as a resin or a copolymer, e.g., a polyvinyl acetate, polyvinyl alcohol, polyvinyl chloride, polyvinyl butyral, acrylic resin, polyurethane, polyester, polyamides, cellulose derivatives, rubber derivatives, starch, casein, dextrin, gum arabic, carboxymethyl cellulose, rosin, silicone, or compositions containing two or more of these ingredients. The release adhesive is preferably a water-based release adhesive.

The flock 112 used in any of the processes discussed herein can be any electrostatically chargeable fiber, such as fibers made from rayon, nylon, cotton, acrylic, and polyester. The flock preferably is resilient under and has a melting and/or softening point that is greater than the temperatures and pressures experienced in design, manufacturing, and later application processes to resist softening, deformation, and melting. Due to its low melt point, acrylic flock is undesirable in many applications. Resilient flock, such as rayon, nylon, and terephthalate (e.g., poly(cyclohexylene-dimethylene terephthalate) polymer flock, is particularly preferred. In most applications, the flock orientation is at least substantially orthogonal (perpendicular) to release sheet 104 and the flock fibers are at least substantially parallel to one another. In one configuration, a conductive coating or finish is applied continuously or discontinuously over the exterior surface of the flock fibers to permit the flock fibers to hold an electrical charge. The flock fibers 112 may be pre-colored (yarn-dyed or spun dyed) before application to the release adhesive 108 or after the carrier 104 is removed, such as by sublimation dye transfer printed.

The adhesive 116 can be any suitable water- or solvent-based adhesive. The adhesive is preferably a high temperature permanent adhesive, such as polybenzimidazoles and silica-boric acid mixtures or cements, hot-melt adhesives, thermosetting adhesives, thermoplastic adhesives, polyurethane, polyester, and combinations and blends thereof. "Hot-melt adhesives" generally refer to a solid material that forms an adhesive bond upon heating and subsequent cooling, "thermosetting adhesives" generally refer to a polymer that solidifies or "sets" irreversibly when heated, and "thermoplastic" generally refers to a polymer that can be repeatedly softened when heated and hardened (re-solidified) when cooled. The irreversible setting of a thermosetting adhesive is commonly affected by cross-linking of at least most, if not all, of the cross-linking reactive entities contained in the adhesive polymer.

More preferably, adhesive 116 is an activatable, permanent thermosetting adhesive in the form of a pre-formed self-supporting film before contact with the flock. Adhesive 116 is preferably activated fully when it is heated above an activation temperature for a sufficient period of time. As will be appreciated, thermosetting adhesives solidify, activate, and/or set irreversibly (that is, become infusible and relatively insoluble in solvents) when chemical entities comprising the thermosetting adhesive chemically react (that is, cross-link) to form covalent bonds at least mostly between the reactive chemical entities comprising the thermosetting adhesive. The chemical, cross-linking reaction is typically initiated and/or maintained by a chemical initiator, thermal energy or radiation (such as, an electron beam or electromagnetic energy). The thermosetting adhesive 116 can be any high polymer that solidifies or sets irreversibly (e.g., B- or C-staged) when heated above a specific temperature (typically its softening temperature). In other words, the adhesive is commonly non-tacky and thermoplastic (or A-staged) in nature as prepared and, upon heating to a suitable temperature, fuses and becomes thermoset (e.g. B- or C-staged) or substantially infusible and insoluble. The thermoset state is usually associated with a cross-linking reaction of the molecular constituents induced by heat or radiation. Curing agents, such as organic peroxides and sulfur (in the case of rubber), may be incorporated in the adhesive 116 to facilitate or catalyze the cross-linking reaction. For example, linear polyethylene can be cross-linked to a thermosetting material either by radiation or by chemical reaction. Examples of thermosetting adhesives include acrylics, polyethylene, polyamides, epoxides, polyurethanes, phenolics, alkyds, amino resins, polyesters, epoxides, rubbers, and silicones.

In one formulation, the thermosetting adhesive 116, when in the thermoplastic state, includes a compound containing three or more isocyanate groups per molecule (such as triphenylmethane, triisocyanate, benzene triisocyanate, tolylene triisocyanate, silicon triisocyanate, ethylene tetraisocyanate, and diphenyl triisocyanate) in which a number of the isocyanate groups are blocked or masked with an isocyanate splitter-type material (such as a phenols and malonic ester), and a polyester containing three or four hydroxyl groups (such as glycerin, trimethylol propane, pentaerythritol, various polyesters with excess hydroxyl groups, and phenol formaldehyde resins). To convert the adhesive to the thermoset state, the adhesive is heated to a higher temperature, for example about 125 degrees Celsius or higher, for a short period of time to free the isocyanate groups from the masking or blocking material and permit their reaction with the hydroxyl groups of the polyester. To accelerate the decomposition reaction or the splitting off of the splitter-type material, a small amount of an accelerator such as a tertiary amine compound, tributyl amine, and tris-(dimethyl aminomethyl) phenol, may be added.

The preformed, self-supporting adhesive film can include fine particles of polymers or copolymers, as well as one or more of plasticizer(s), stabilizer(s), curing agent(s) (such as an isocyanate), pigment(s), etc. The pigment, if any, determines the color and opacity of the adhesive film. The stabilizer, used when pigment is added, prevents discoloration of the resin film.

During manufacture flocked intermediate assembly 134 may be adhered to substrate 124. In one embodiment, when thermosetting adhesive layer 116 and substrate 124 are compatible; that is, are capable of forming a substantially strong, permanent adhesive bond, thermosetting the adhesive 116 and the substrate 124 are contacted and heat and pressure applied to the carrier sheet 104. In another embodiment, when the thermosetting adhesive layer 116 and substrate 124 are substantially non-compatible, that is, are not capable of forming a substantially strong, permanent adhesive bond, or it is desirable to adhesively bond flocked intermediate assembly 134 to the substrate 124 by an adhesive other than the thermosetting adhesive 116, adhesive layer 120 is interposed between the adhesive layer 116 and the substrate 124, and heat and pressure are applied to the carrier sheet 104.

To understand the need for positioning adhesive layer 120 between thermosetting adhesive layer 116 and substrate, one should understand polymer blends and the theories behind adhesion. While not wishing to be bound by any theory, several theories have been proposed to explain polymer blends and adhesion.

A polymer blend or alloy is the polymeric material that results from mixing two or more polymers of differing chemical compositions. Polymer blends are affected by at least the following: the equilibrium phase behavior and morphology of the mixture; the interfacial properties of the mixture; the type and magnitude of the physical and chemical interactions between the components comprising the mixture; and the rheological properties of mixture. For example, depending on the free energy of mixing, two amorphous polymers can form a single miscible phase when the polymeric components are intimately mixed or the two components can form two distinct phases comprised primarily of the individual polymeric components. In general, for two or more polymers of differing chemical compositions to be miscibility $\Delta G_{mix} < 0$ and $(\partial^2 \Delta G_{mix}/\partial \Phi_i^2)_{T,P} > 0$, where:

$$\Delta G_{mix} = \Delta H_{mix} - T\Delta S_{mix} \tag{1}$$

$$(\partial^2 \Delta G_{mix}/\partial \Phi_i^2)_{T,P} = (\partial^2 G/\partial \Phi_i^2)_V + (\partial^2 V/\partial p)_{T,\Phi_i}(\partial^2 G/\partial \Phi_i \partial V)^2 \tag{2}$$

and where $\Delta H$ and $\Delta S$ represent, respectively the enthalpic and entropic parts, T the temperature, P the pressure, V the volume, and $\Phi_i$ the volume fraction of component i. The thermodynamic principles of mixing can be combined with the Flory-Huggins Theory to further understand how polymeric properties, such as molecular weight, dispersive interactions, solubility parameters, hydrogen bonding, can affect polymer miscibility (or mixing).

The two most common techniques for preparing polymer blends are solution casting and melt mixing, such as by blow, sheet or co-extrusion. The mixing (or miscibility) can be complete, where polymeric materials A and B are combined to form a polymer blend AB, wherein polymers A and B are combined to produce polymer AB. Or, the mixing can be localized to a contact zone, for example a heated polymeric film (or softened or melt) of polymer A and the heated polymeric film (or softened or melt) of polymer B are contacted, such that within the contacting zone polymers A and B combine to form polymer AB, while outside of the contacting zone polymer film polymer A remains substantially polymer A and polymer B remains substantially polymer B.

It is important to note that the above only briefly outlines the general principles encompassing polymer-polymer interactions. Further more those skilled in the art recognize that there is not a method to a priori predict polymer-polymer interactions and resulting equilibrium-phase behavior.

While not wishing to be bound by any theory, several theories have been proposed to explain adhesion, the five most commonly accepted theories being: 1) mechanical interlock, 2) dispersive, 3) chemisorption, 4) electrostatic, and 5) diffusion. No one theory explains completely adhesion or the adhesion process. However, one should understand the five theories and how they impact the adhesion of materials being attached. The five theories are summarized below.

The mechanical interlocking theory postulates good adhesion when an adhesive penetrates a roughen adherent surface having crevices, pores, and/or holes, and is cured within the crevices, pores and/or pores of the adherent, thereby mechanically interlocking the cured adhesive with the adherent. Optimal mechanical interlocking of the adhesive to the adherent occurs when the adhesive wets and/or penetrates the roughened adherent surface. Maximum bond strength is typically the mechanical strength of the adhesive.

Dispersive theory involves intermolecular Van der Waals dispersive forces between closely adjoining surfaces due to Keesom and/or London forces between the adherent and adhesive. Keesom and London forces are due to dipole-dipole attractive forces. Optimal adhesion occurs when the adhesive and the adherent are in intermolecular contact, optimal intermolecular contact is achieved when the adhesive has a lower surface energy than the adherent and is able to wet and spread on the substrate surface. The strength of a Van der Waals dispersive force is typically about 0.1-40 KJ/mole and varies by $1/r^6$ power, where r is the distance separating the dipoles.

In the chemisorption theory an ionic or covalent bond is formed between the adhesive and the adherent, typically bond formation is across the adhesive adherent interface, either directly across the interface or through a chemical coupling agent. In some instances the adherent surface is chemically modified or derivatized to facilitate the formation of chemical bonds. The adhesive strength of a covalent bond is typically in the range of about 60-700 KJ/mole.

In the electrostatic theory the adhesive force is attributed to dipole-dipole attractive forces across the boundary separating the adhesive and adherent, the dipoles can be permanent or induced. The attractive force is typically the order of 4-20 KJ/mole and varies by $1/r^3$, where r is the distance separating the dipoles.

The diffusion theory is typically associated with polymer-polymer adhesion where the polymeric adhesive and adherent inter-penetrate. Optimal interpenetration typically occurs when the adhesive and adherent are mutually compatible and miscible and where the movement and entanglement of the long polymeric chains comprising the adhesive and adherent occurs. Diffusion is affected by contact time, temperature, and molecular properties, such as but not limited to: molecular weight (e.g., number average, weight average or polydispersity average); physical form (i.e., liquid or solid); and physical properties, such as for example, crystallinity, degree of cross-linking, and solubility parameters.

Returning to the adherence of flocked assembly 134 to substrate 124, one embodiment adheres the thermosetting adhesive layer 116 and substrate 124 to form a substantially strong, permanent adhesive bond. While not wanting to be bound by theory, it can be appreciated, that the thermosetting adhesive 116 is capable of adhesively bonding to substrate 124 in response to the application of heat and pressure during the cross-linking process by one or more of the following: a) the flow of the adhesive into roughened surface areas of substrate 124 that when cross-linked mechanically interlocks the adhesive 116 with the substrate 124; b) dispersive interactions (dispersive interactions typically improve adherence when the adhesive 116 has a lower surface energy than the substrate 124); c) the formation of covalent (or ionic) bonds when the substrate 124 contains chemical entries capable of chemically reacting with the adhesive 116; d) the use of electrostatic interactions, as in the case of dispersive interactions, electrostatic interactions typically improve when the adhesive 116 has a lower surface energy than substrate 124; and e) the use of diffusional interactions are less restrained prior to the adhesive 116 being fully cross-linked, wherein the polymer chains comprising adhesive 116 become covalently interconnected and substantially prevented from any diffusional movement. It can be appreciated that conditions can be such that thermosetting adhesive 116 is not capable of forming a sufficiently strong permanent bond with substrate 124 as for example, but not limited to, the adhesive 116 having a higher surface energy than substrate 124, the adhesive 116 and substrate 124 are not miscible and cannot form a strong diffusional bond, or the polarities of adhesive 116 and substrate 124 are such that dipole-dipole interactions do not favor adhesion.

In the instance where thermosetting adhesive layer 116 and substrate 124 are not substantially compatible, that is, are not capable of forming a substantially strong, permanent adhesive bond, or it is desirable to adhesively bond flocked intermediate assembly 134 to substrate 124 by an adhesive other than a thermosetting adhesive 116, adhesive layer 120 is interposed between the layer adhesive 116 and substrate 124, and heat and pressure are applied to the carrier sheet 104. In such a case the adhesive layer 120 is preferably comprised of at least a first part 128 and a second part 132, more preferably the first and second parts having at least one differing chemical or physical property. As for example, the first and second parts can differ in one or more of polarity, chemical property, physical property, and any combination thereof. In an even more preferred embodiment, the first part 128 of adhesive layer 120 is positioned adjacent to the thermosetting adhesive 116, and the first part 128 comprises one or more of a chemical property, physical property and any combination thereof that provides for enhanced adhesion of the adhesive layer 120 to the adhesive layer 116 compared to the adhesion of the adhesive layer 116 to the substrate 124. Similarly, in another even more preferred embodiment, the second part 132 of adhesive layer 120 is positioned adjacent to the substrate 124, with the second part 132 including one or more of a chemical property, physical property, and any combination thereof that provides for enhanced adhesion of the adhesive layer 120 to the substrate 124 compared to the adhesion of the adhesive layer 116 to the substrate 124. It is also to be appreciated that the interaction of the first part 128 with the adhesive layer 120 is preferably substantially strong and substantially permanent to sufficiently maintain a strong, permanent adhesive bond of the flocked assembly 134 to the substrate 124. Likewise, it is to be appreciated that the interaction of the second part 132 with the adhesive layer 120 is substantially strong and substantially permanent to sufficiently maintain a strong, permanent adhesive bond of the flocked assembly 134 to the substrate 124.

The first part 128 and the second part 132 can or cannot be chemically compatible. For example, the chemically incompatible first and second parts can be separated in adhesive layer 120 by at least one or more other parts (not depicted in FIG. 1) or the first and second parts can be partitioned within the adhesive layer 120 in such a manner that chemically incompatibility is not detrimental to the form and/or function of the adhesive layer 120 or the flocked decorative product 100. Chemically compatible or chemically incompatible first and second parts can be combined to form the adhesive layer 120, as for example, a multi-layered adhesive film can be extruded by means of blow or sheet extrusion (e.g., flat extrusion or chill-roll extrusion). In these extrusion processes, the raw materials are softened or at least partially liquefied and then formed into a flat film using a sheet die or into a tube using a ring die. In co-extrusion, multiple films are extruded one-on-top-of-the-other in a flat extrusion installation.

The thickness of the film 120 ranges from about 5 to about 2,500 mu and more preferably from about 10 to about 1,000 mu.

Preferably the first and second parts 128 and 132 have differing compositions, more preferably compositions that differ physically and/or chemically from one another. Even more preferably, the first part 128 and the second part 132 compositions differ in at least one chemical and/or physical adhesion property. Or stated another way, one or more chemical and/or physical adhesive properties of the first part 128 and the second part 132 differ, such that, the adhesive interaction of the first part 128 with the adhesive layer 116 differs from the adhesive interaction of the first part 128 with the substrate 124, and the adhesive interaction of the second part 132 with the adhesive layer 116 differs from the adhesive interaction of the part 132 with the substrate 124. Or stated yet another way, the adhesive interaction of the second part 132 with the substrate 124 is greater, that is, forms a stronger, more permanent bond, than the adhesive interaction of the substrate 124 with previously fully cured, thermoset adhesive layer 116; and the adhesive interaction of the part 128 with previously fully cured, thermoset adhesive layer 116 is greater, that is, forms a stronger, more permanent bond, than the adhesive interaction of substrate 124 with previously fully cured, thermoset adhesive layer 116. Stated another way, the first part 128 forms a stronger adhesive bond with the adhesive layer 116 than the second part 132, and the second part 132 a stronger adhesive bond with the substrate 124 than the first part 128.

By way of example, a first part of the layer has, as the primary component, a first polymer, which has a first adhesive property (such as polarity), and the second part of the layer has, as the primary component, a second polymer, which differs from the first polymer and typically has a second adhesive property (such as a polarity) that differs from the first adhesive property. Preferably, the first and second parts are formulated and joined together to form adhesive layer 120 so that they do not weaken and/or degrade their respective adhesive interactions within the adhesive layer 120 when heated, such as for example, when first and second parts flow together to form an adhesively weak phase when melted. While not wanting to be bound by theory, it can be appreciated that, when the first and second parts are substantially immiscible it is preferred that the first and second parts do not flow together when melted to substantially adhesively weaken the adhesive layer 120.

The first polymer can be the same as the primary polymer of the thermosetting adhesive layer 116. The second polymer may be the same as the primary polymer of the adjacent surface of the substrate 124. Potential first or second polymers for the first or second parts include rubber, polyesters, polyurethanes, polyolefins, polyvinyl chloride, nylon, polyamides, fluorocarbon, linear polyethylene, polystyrene, polypropylene, and cellulosic and acrylic resins and mixtures and co- and terpolymers thereof. For example, the first polymer, which is preferably non-polar, can be, for example, a polyester, polyolefin, and the like, and the second polymer, which is preferably polar, can be rubber, a polyurethane, a copolyolefin, polystyrene, polyvinyl chloride, polyethylene, copolyesters such as polyethylene terephthalate, and the like. Particularly preferred multi-component films are the multi-layered films manufactured by Collano Xiro.

The thermoplastic adhesive layer 120 can be any high polymer, or mixture or combination of high polymers, capable of being repeatedly softened when heated and hardened when cooled. In other words, the post-heated state of adhesive layer 120 is preferably substantially reversible while that of thermosetting adhesive 116 is not. The cross-linking process irreversibly hardens the thermosetting adhesive layer 116. In one configuration, the thermoplastic adhesive layer 120 is a dual laminated or co-extruded, solid, and self-supporting film. In another embodiment the thermosetting adhesive layer 116 and the thermoplastic adhesive layer 120 are pre-cut or configured, prior to contacting the substrate 124 and/or flocked assembly 134.

The first and second parts 128 and 132 may also be formulated to have one or more differing properties. By way of example, the first and second parts may have one or more of differing melting temperatures, softening points, viscosities, surface tensions, adhesion properties (such as, permanent or induced dipole moments, surface roughness properties, chemical entities, or such) and bond strengths. In one configuration, the first and second parts have differing adhesive properties, wherein the adhesive properties of the part 128 are such that a strong, permanent adhesive bond is formed with the thermosetting adhesive layer 116, and wherein the adhesive properties of the part 132 are such that a strong, permanent adhesive bond is formed with the substrate 124. For example, the adhesive part 128 can provide for a surface tension of the surface of the adhesive layer 120 in contact with the adhesive layer 116 to be about less than or about equal to the surface tension of the adhesive layer 116, thereby providing for enhanced adhesion. Similarly, the adhesive part 132 can provide for a surface tension of the surface of the adhesive layer 120 in contact with the substrate 124 to be about less than or about equal to the surface tension of the substrate 124, thereby providing for enhanced adhesion. It is to be appreciated that the surface tensions of the adhesive layer 116 and the substrate 124 are preferably substantially different, and that, for the adhesive layer 120 to substantially, respectively, wet the adhesive layer 116 and the substrate 124 the respective surfaces of the adhesive layer 120 should have differing surface tensions.

In one configuration, the first part 128 has a different (preferably lower) melting point than the second part 132. In one configuration, the first part 128 has a different (preferably lower) viscosity, at a given temperature, than the viscosity of the second part 132. In one configuration, the first part 128 has a different (preferably lower) softening point than the softening point of the second part 132.

The adhesive layers 116 and 120 may be in the form of a liquid or solid film, with solid being preferred, and may be manufactured by any suitable techniques. For example, the films may be solvent cast onto a backing material and, after solidification, be self-supporting, pre-formed, solid films. The first and second parts of the adhesive layer 120 are bonded together to form a film by known techniques. The adhesive film 120 can have an optional backing material. The optional backing material 220 can be any sacrificial material, including those identified above for the carrier sheet 104. In a preferred embodiment the adhesive film 120 does not have the optional backing material 220.

The system and process for manufacturing the article 100 will now be discussed with reference to FIGS. 2-8.

Figure 2A:
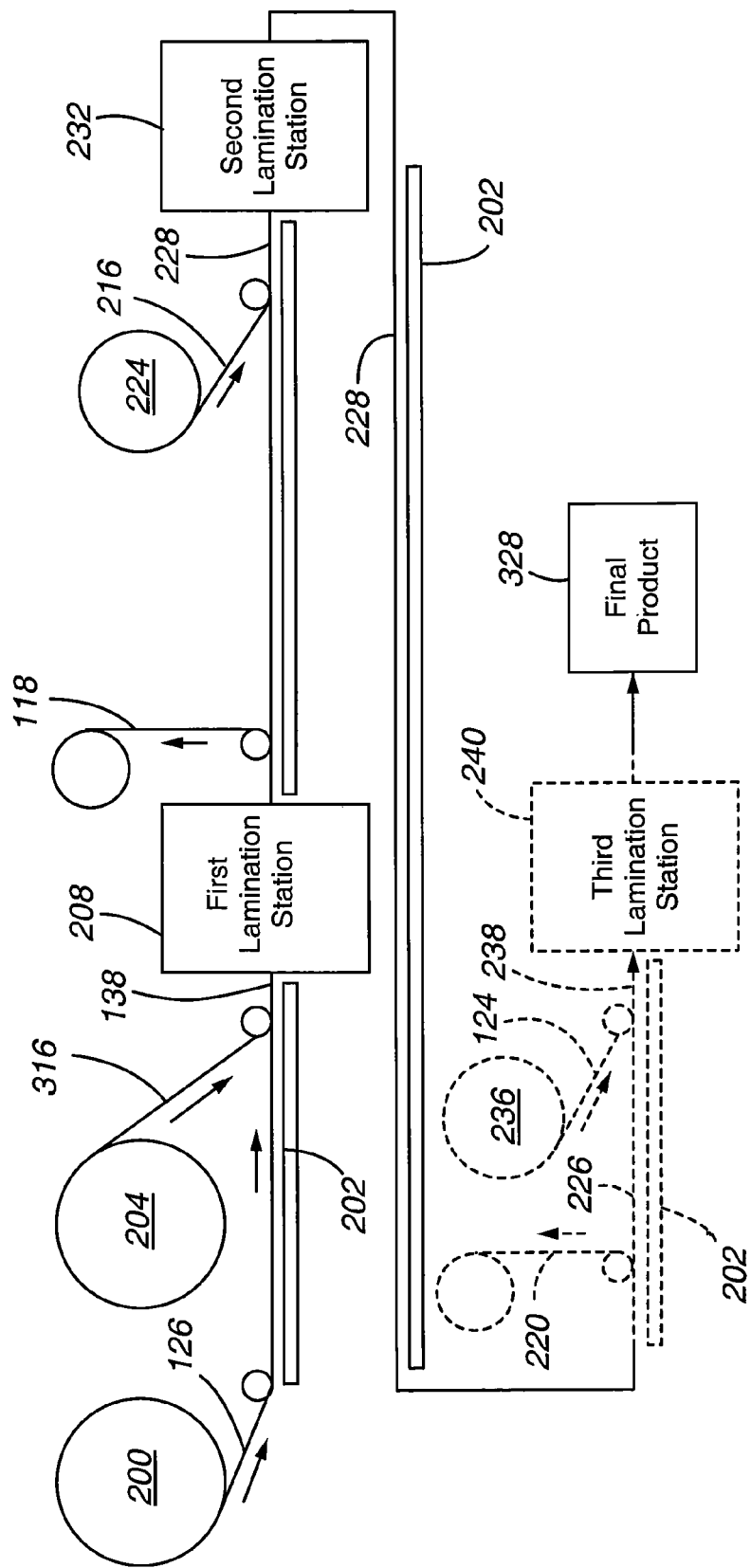
FIG. 2A is a side view of a manufacturing line for the flocked article of FIG. 1.
Figure 2B:
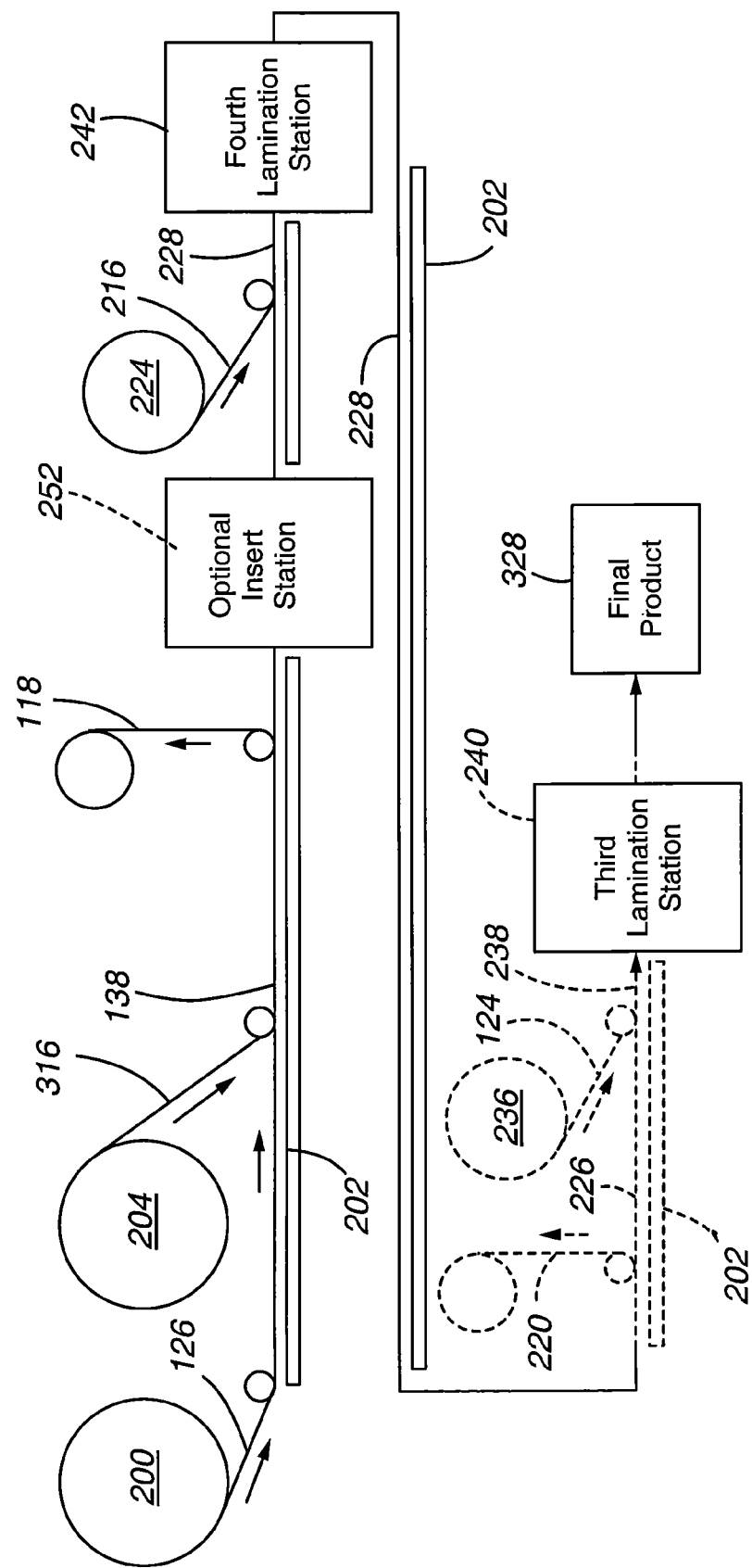
FIG. 2B is a side view of a manufacturing line for the flocked article of FIG. 7E.
Figure 3A:
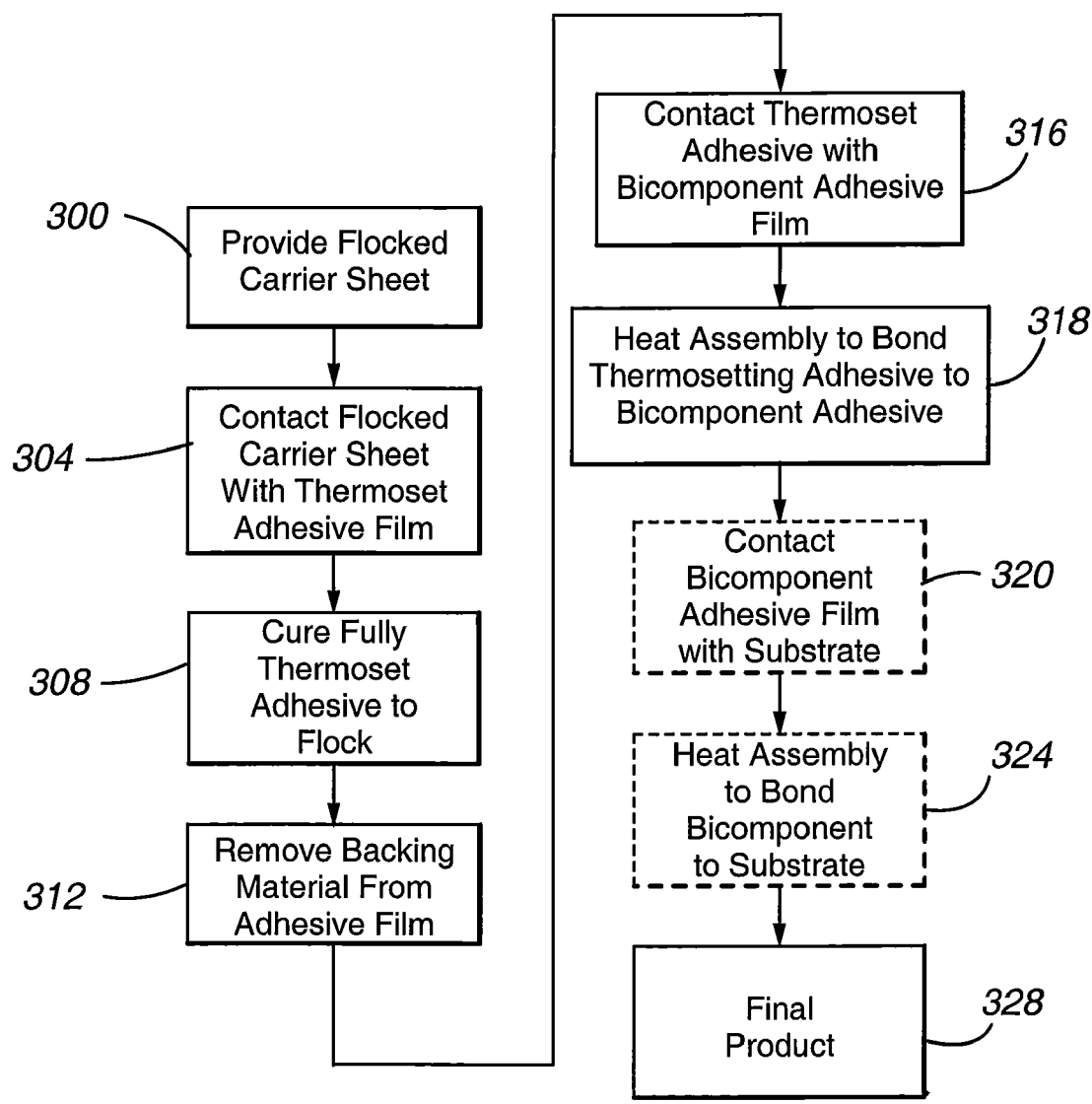
FIG. 3A is a flow chart of the manufacturing line of FIG. 2A.
Figure 3B:
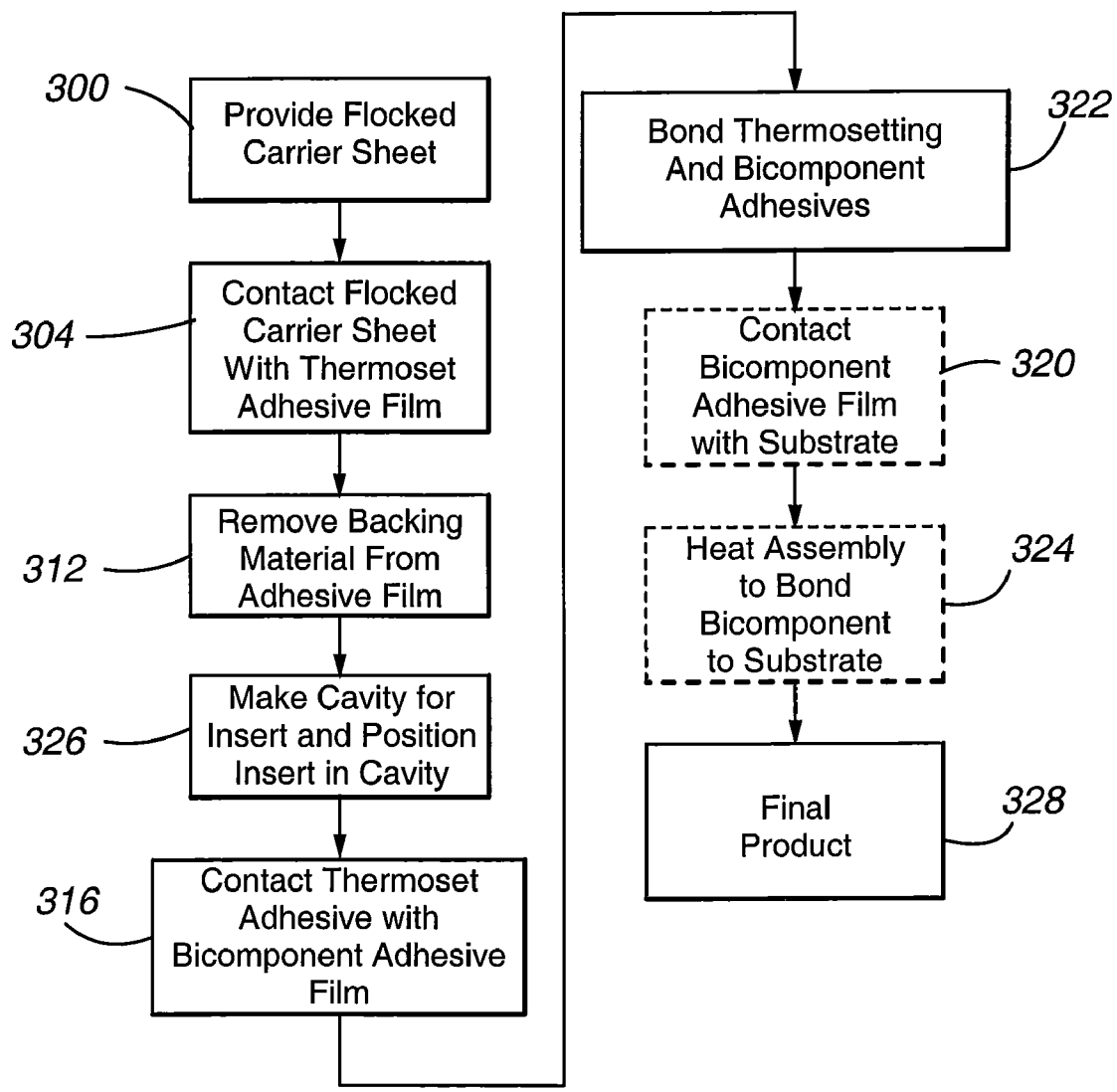
FIG. 3B is flow chart of the manufacturing line of FIG. 2B.

In step 300, a flocked carrier sheet 126 (depicted in FIG. 1) is provided. The flocked carrier sheet 126 is preferably formed by screen printing the release adhesive film 108 in a desired pattern (which typically is the mirror image of the desired final flock pattern) on the carrier sheet 104 followed by flocking electrostatically the carrier sheet 104. In the system of FIG. 2, the flocked carrier sheet 126 is dispensed on a first roll 200.

Figure 4:
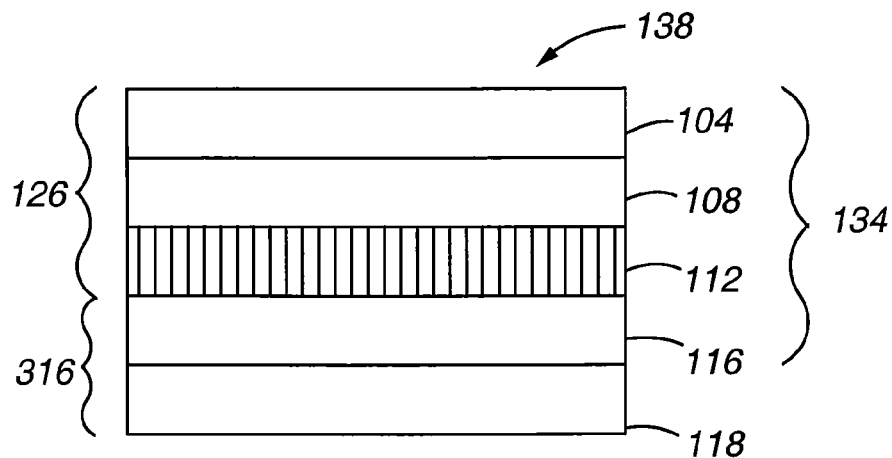
FIG. 4 is a side view of a flocked article according to an embodiment of the present invention.

In step 304, the flocked carrier sheet 126, while on a moving web 202, is contacted with a pre-formed, self-supporting thermosetting adhesive film 316 which is a combination of the thermosetting adhesive layer 116 in the thermoplastic state, that is the thermosetting adhesive 116 is substantially in the A- and/or B-stage, and a sacrificial backing material 118 to form a second intermediate flocked assembly 138 as shown in FIG. 4. In the system of FIG. 2, the film 316 is dispensed on a second roll 204, where the adhesive 116 contacts the free ends of flock 112. Or stated another way, the opposing ends of the flock not in contact with the release adhesive 108 contact the adhesive layer 116 in step 304.

While in contact, the flocked carrier sheet 126 and adhesive film 316 enter into a first lamination station 208, wherein the second intermediate flocked assembly is heated and subjected to pressure. In the station 208, the film 316 is preferably heated to a temperature of at least about 300 degrees F. and more preferably from about 310 to about 450 degrees F. (or preferably above the softening point of the adhesive layer 116) while pressure (which depends on the density of the flock fibers), preferably of at least about 1 psi and more preferably ranging from about 5 to about 25 psi, is applied to the backing material 118. Preferably the applied pressure is at least sufficiently enough to cause the flock fibers to penetrate the surface of the adhesive layer 116 and be at least sufficiently permanently embedded in the adhesive layer 116. The heat and pressure are applied for at least about 0.5 minutes, more preferably at least about 1 minute. As will be appreciated, the orientation of flocked carrier sheet 126 and adhesive film 316 can be reversed, such that the carrier sheet 104 is on top and the backing material 118 on bottom, while still maintaining the contacting of the free ends of flock 112 with adhesive 116. When the orientations of flocked carrier sheet 126 and adhesive film 316 are reversed the lamination pressure is applied to the carrier sheet 104.

In step 308, the intermediate flocked assembly 138 is heated for a sufficient time (typically from about 15 seconds to about 5 minutes) for the adhesive layer 116 to reach at least a temperature to thermoset, cross-link, or substantially completely C-stage adhesive layer 116. To C-stage a thermosetting adhesive means to achieve the final stage in the reaction of a thermosetting resin in which the material is relatively insoluble and infusible. In this thermoset state the adhesive layer 116 will, as noted below, form a blocking layer to inhibit, in subsequent lamination stages, the thermoplastic adhesive layer 120 from flowing into and between the flock fibers and thereby compromising the degree of plushness of the flock fibers.

The intermediate flocked assembly 138 is allowed to cool to a temperature below the maximum temperature experienced in the first laminating station 208.

In step 312, the backing material 118 is removed from the substantially fully activated thermosetting adhesive layer 116. This can be done by any suitable technique known to those of ordinary skill in the art.

Figure 5:
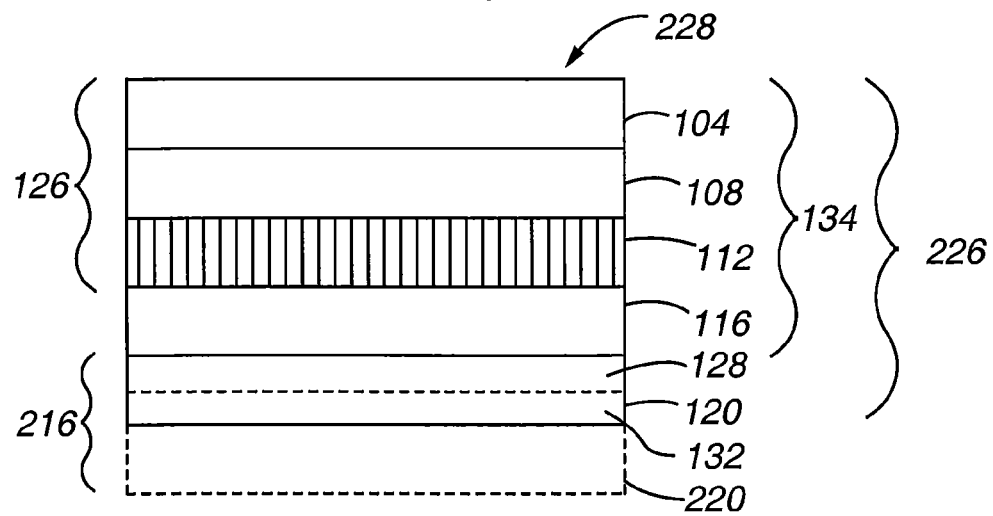
FIG. 5 is a side view of another flocked article according to an embodiment of the present invention.
Figure 6:
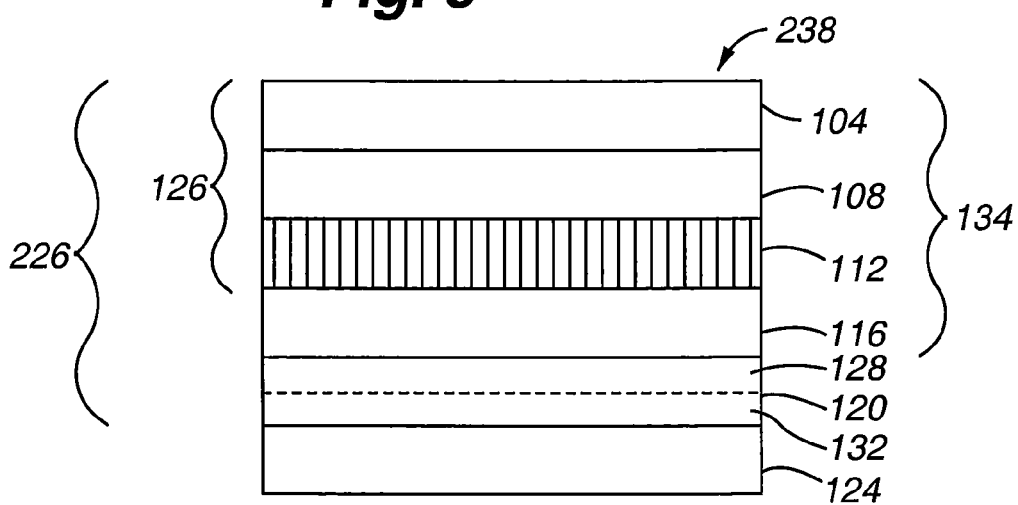
FIG. 6 is a side view of another flocked article according to an embodiment of the present invention.
Figure 7A:
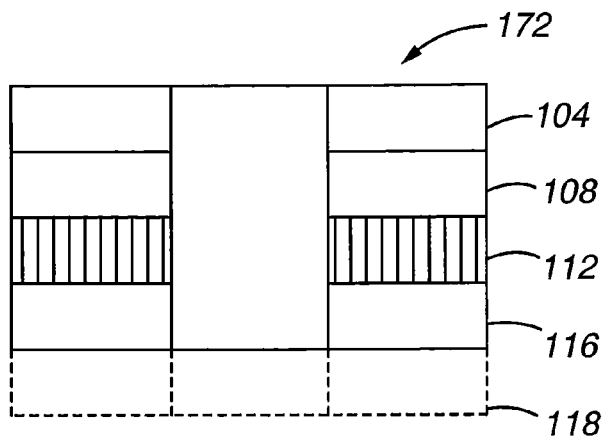
FIGS. 7 A-E are side and top views of another flocked article according to an embodiment of the present invention.
Figure 7B:
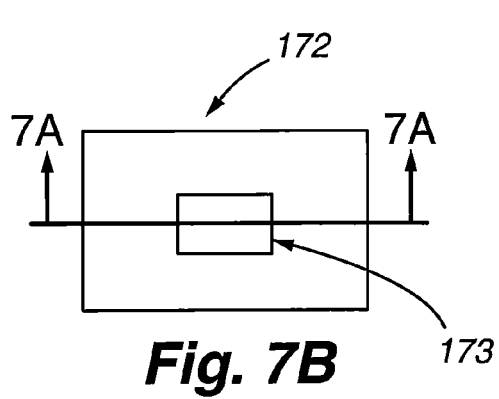
Figure 7C:
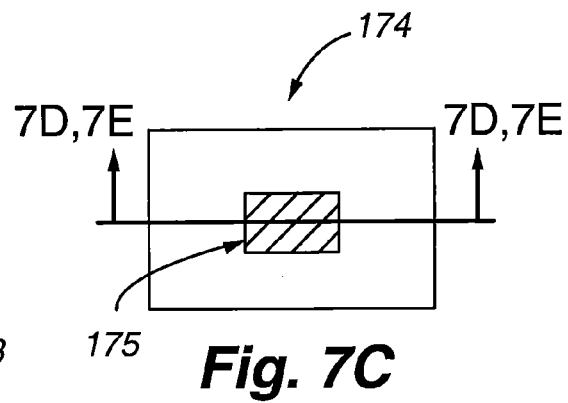
Figure 7D:
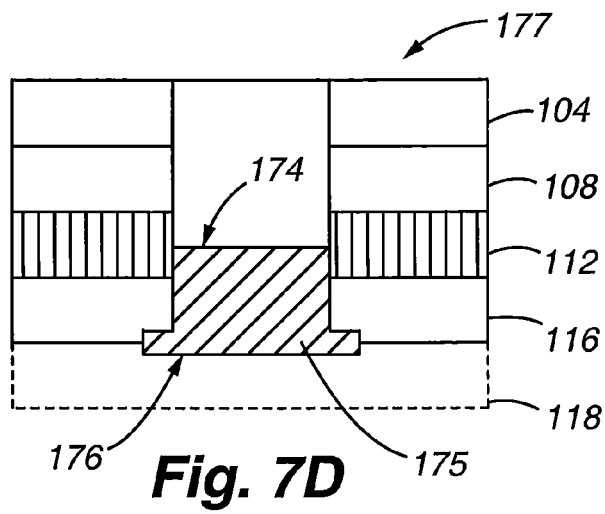
Figure 7E:
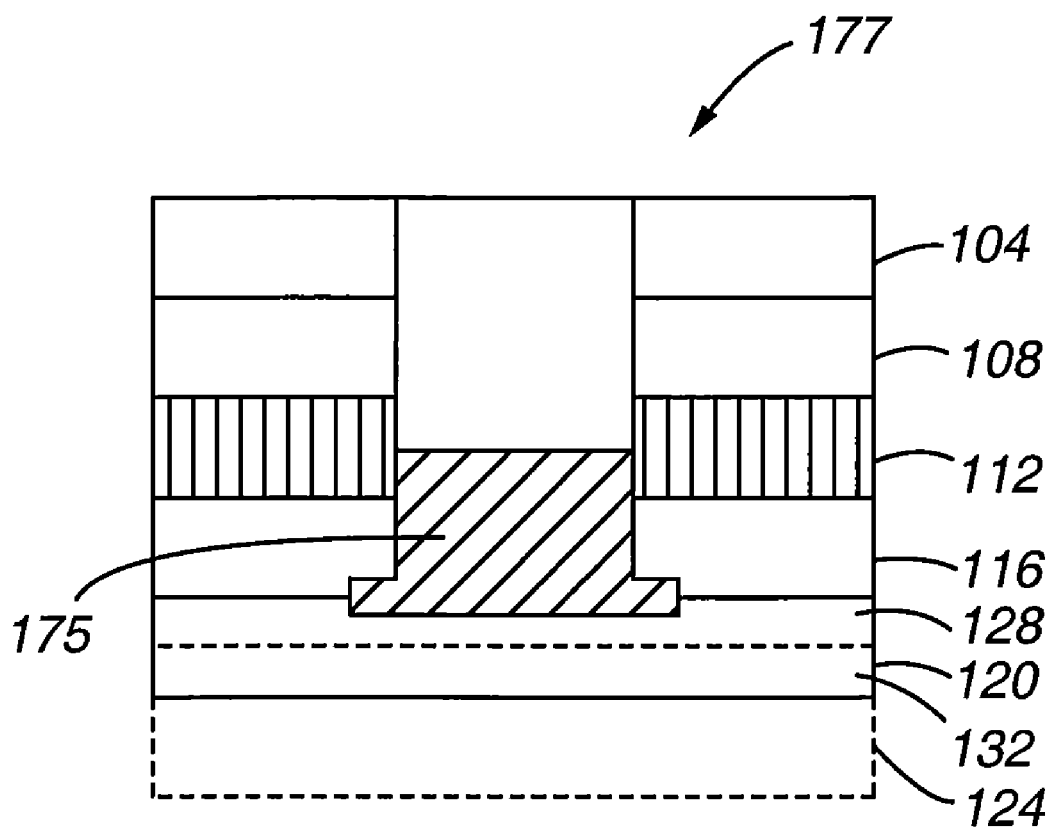

In step 316, the fully activated thermosetting adhesive layer 116 (that is, adhesive layer 116 is substantially fully cross-linked or C-staged) is contacted with the thermoplastic adhesive film 216, which is a combination of the thermoplastic adhesive layer 120 and the optional backing material 220, FIG. 5, to form a third intermediate assembly 228, comprising intermediate flocked assembly 134 and thermoplastic film 216. In one embodiment the thermoplastic adhesive film 216 does not have optional backing material 220, that is, the thermoplastic adhesive film is comprised of the thermoplastic adhesive layer 120. In the system of FIG. 2, the film 216 is dispensed on a third roll 224.

While in contact, the intermediate flocked assembly 134 and film 216 enter into a second lamination station 232, where heat and pressure are applied to the third intermediate assembly 228. In the station 232, the film 216 is preferably heated to a temperature of at least about 150 degrees F. and more preferably from about 175 to about 375 degrees F. (or preferably above the softening point of the adhesive layer 120) while pressure (which depends on the density of the flock fibers), preferably of at least about 1 psi and more preferably ranging from about 5 to about 25 psi, is applied to the backing material 220 to cause the first part 128 of the thermoplastic adhesive layer 120 to firmly contact and adhere to the thermosetting adhesive layer 116. As will be appreciated, the orientation can be reversed, with the adhesive layer 116 in contact with the adhesive layer 120, such that the carrier sheet 104 is on top and the backing material 220 on bottom. In the latter, pressure is applied to the carrier sheet 104. In this step, the adhesive layer 120 is heated for a time typically ranging from about 1 to about 60 seconds. In either orientation the thermosetting adhesive layer 116 forms a blocking layer to inhibit the thermoplastic adhesive layer 120 from flowing into and between the flock fibers.

The adhesive layers 116 and 120 have differing properties. As will be appreciated, the C-staged, thermosetting adhesive layer 116, when heated, is more viscous (and therefore more resistant to flow) than the thermoplastic adhesive layer 120, which softens and flows when heated to a temperature at least about equal to or above its softening and/or melt temperature (s). While not wishing to be bound by any theory, the highly viscous, infusible state of the C-staged, thermosetting adhesive 116 is due to the cross-linking reactions when adhesive layer 116 was laminated to flocked assembly 126 in step 308. This highly viscous, infusible state substantially limits the ability of the C-staged, thermosetting adhesive layer 116 to flow between the flock fibers and/or limits the ability of the softened and/or liquefied thermoplastic adhesive layer 120 to penetrate and diffuse through the C-staged thermosetting adhesive 116 into flock layer 112 and thereby penetrate between the flock fibers comprising the flock layer. The fully activated adhesive layer 116 thus maintains the plushness of the flock layer 112. Typically, the temperature at which the C-staged, thermosetting adhesive layer 116 softens, if at all, in step 308 is greater than the temperature at which the thermoplastic adhesive layer 120 softens in step 318.

The final product 328 comprises adhesively joined assembly 228. The adhesively joined assembly 228 can also be cut to form a decorative flocked transfer assembly 328.

The optional backing material 220 may be then removed from the thermoplastic layer 120, to form a fourth intermediate assembly 226.

In optional step 320, the free surface of the thermoplastic layer 120 of the fourth intermediate assembly 226 is contacted with an optional substrate 124 to form an optional assembly 238. Optional substrate 124 is provided by optional fourth roll 236. In optional step 324, the optional assembly 238 is passed through an optional third laminating station 240 where heat and pressure are applied to the assembly 238 to form a final product 328. In the optional station 240, the film 120 is preferably heated to a temperature of at least about 150 degrees F. and more preferably from about 175 to about 375 degrees F. (or preferably above the softening point of the adhesive layer 120) while pressure (which depends on the density of the flock fibers), preferably of at least about 1 psi and more preferably ranging from about 5 to about 25 psi, is applied to the optional substrate 124 to cause the adhesive layer 120 containing the second part 132 to firmly contact and adhere to the substrate. As will be appreciated, the orientation can be reversed, while the contact of the free surface of the adhesive layer 120 with the substrate is still maintained, such that the carrier sheet 104 is on top and the optional substrate 124 on bottom in which case pressure is applied to the carrier sheet 104. In optional 240 laminating station, the adhesive layer 120 is heated for a time typically ranging from about 1 to about 60 seconds to where adhesive layer 120 is adhesively adhered to substrate 124 in flocked assembly 238 to from flocked decorative article 328. It can be appreciated that flocked assembly 238 can be cut to form decorative flocked product 328 prior to or after laminating station 240. It can also be appreciated that substrate 124 can be pre-cut prior to contacting 320.

In another embodiment, in step 326 (FIG. 3B) insert station 252 (FIG. 2B) removes a portion of the intermediate 138, to form an insert intermediate assembly 172 having a cavity 173 bordered by flock fibers, FIGS. 7 A-C. An insert 175, having a design medium side 174 and a second opposing side 176, is positioned in registration with the cavity 173, depicted in FIG. 7D such that the design medium side 174 is bordered by the flocked fibers.

The design medium 174 can be any design media including metallic or synthetic or natural polymeric design media, and can be woven or non-woven design media. Examples of design medium materials include reflective materials (such as those having a metallic sheen or luster), textiles (such as a woven nylon or polyester material textile and twill), a material containing a hologram or print image, and the like. In one configuration, the design medium 174 is an extremely durable, woven nylon textile that strongly resembles embroidery. In another configuration, the design medium 174 is a twill material. Another particularly preferred design medium is an embossed or molded article, preferably containing a permanently raised three-dimensional surface or pattern in the textile material, such as but not limited to appliqués or transfers. In another preferred embodiment the design medium 174 is a woven textile product sold under the trade name ObiTex™ by Fiberlok®, having an enhanced surface texture and luster that provides an embroidered or hand-stitched embroidered appearance. A preferred woven textile design medium can be a loosely, woven polyester with increased surface dimensionality or character, with or without a printed image, such as a sublimation dye printed image. Exemplary heat transfers that can be modified by the present invention are Lextra 3D™ with Tackle Twill and Lextra 3D NX™, both sold by Fiberlok®. In one configuration, the design medium 174 is formed from one or more polymeric light diffusing films, such as polycarbonate and/or polyester light diffusion films sold under the trade names Makrofol™ and/or Bayfol™. An exemplary heat transfer that may be modified by the present invention is Lextra 3D™ with metallic textile design medium sold by Fiberlok®.

The opposing side 176 of the insert 175 can be the same as the design medium side 174 or it can differ, as for example the opposing side 176 can be any adhesive material, polymeric material, or other material adhered to or fabricated to the design medium side 174.

When the insert 175 is positioned in registration with the cavity 173 it is contacted the thermosetting adhesive 116 while the thermosetting adhesive 116 is in a substantially thermoplastic (that is A-staged) condition. While not wanting to be bound by theory, the A-staged thermosetting adhesive 116 is tacky and capable of substantially holding the insert in registration with the cavity to form a second insert intermediate (not depicted). The second insert intermediate is contacted with the thermoplastic adhesive film 216 in step 316. In step 322 the thermosetting adhesive is bonded to the flock fibers and to the insert 175 as described above in step 312 and the adhesive layer 120 is bonded to the thermosetting adhesive layer 116 and to the insert 175 as described above in step 318. It can be appreciated that the surface 174 of the insert 175 is substantially compatible with and capable of forming a substantially strong, permanent adhesive bond both with the thermosetting adhesive 116. It can also be appreciated that the first part 128 of the thermoplastic adhesive layer 120 is compatible with and capable of forming a substantially strong, permanent adhesive bond both with the surface 176 of the insert 175 and the cross-linked thermosetting adhesive 116. Stated another way, the lower surface 176 of the insert 175 and adhesive 116 can have substantially the same or different, compatible, surface properties.

It can be appreciated, that step 312 can optionally occur within step 326. For example, step 312 can occur after a portion of intermediate 138 is removed to create the cavity 173 but prior to the second insert intermediate contacting the thermoplastic adhesive layer 216.

The thermal bonding processes of the thermosetting adhesive 116 and the adhesive layer 120 in step 322 occur in a fourth lamination station 242 to produce a flocked decorative article 177 with the insert 175 surrounded by flock. Optionally the flocked decorative article 177 can be attached to a substrate 124 in steps 320 and 324 to form the flocked decorative article 177 adhered to the substrate 124.

A number of variations and modifications of the invention can be used. It would be possible to provide for some features of the invention without providing others.

In another alternative embodiment, the thermosetting and/or thermoplastic adhesive layers are applied in liquid form rather than solid form.

In yet another alternative embodiment flocked assembly 134 can be the flock transfer assembly comprising a carrier sheet 104, release adhesive 108, flock layer 112 and a binder adhesive as disclosed by Abrams in U.S. Pat. No. 4,810,549.

In yet another alternative embodiment, the flock is applied directly to the thermosetting layer 116 with or without an intermediate adhesive on the surface of the film 316 to hold the flock in position until the flock is pressed into the softened thermosetting layer 116 in a lamination station. In one configuration, the thermosetting adhesive layer is heated to the point of being tacky (while still in the thermoplastic state) and the flock fibers electrostatically flocked into the tacky adhesive layer. The adhesive layer may then be heated to a higher temperature to soften further and cross-link the adhesive to the thermoset state while the flock fibers are pushed into the softened adhesive. In this embodiment, steps 304, 308, 312, 316, 320, 326, and 324 remain the same, and the intermediate assembly does not have the carrier sheet 104 and release adhesive 108 positioned on top of the flock layer 112.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A flocked decorative article, comprising:
   (a) a flock layer comprising flock fibers;
   (b) a fully activated thermosetting adhesive layer comprising a curing agent; and
   (c) a thermoplastic adhesive layer having a first surface bonded to the fully activated thermosetting adhesive layer and a second surface opposed to the first surface, the fully activated thermosetting adhesive layer being positioned between the flock layer and the thermoplastic adhesive layer, wherein the thermoplastic adhesive layer comprises first and second layers differing in one or both of chemical and physical adhesion properties, the first layer of the thermoplastic adhesive layer being bonded to the fully activated thermosetting adhesive layer, the fully activated thermosetting adhesive layer being positioned between the flock layer and the thermoplastic adhesive layer and the first layer being positioned between the second layer and the fully activated thermosetting adhesive layer.

2. The article of claim 1, wherein, when the flock layer, fully activated thermosetting adhesive layer, and thermoplastic adhesive layer are subsequently heated and the thermoplastic adhesive layer adhered permanently to a substrate, at least one of the following is true: the curing agent is substantially immobilized in the fully activated thermosetting adhesive layer and the fully activated thermosetting adhesive layer inhibits the thermoplastic adhesive layer from flowing into and between the flock fibers; and
   (d) a sacrificial backing material removably adhered to the second surface.

3. The article of claim 2, wherein the first and second layers differ in one or more of mechanical adhesion, dispersive adhesion, chemisorption adhesion, electrostatic adhesion, diffusion adhesion, solubility parameter, melting temperature, softening point, viscosity, surface energy, degree of crystallinity, hydrogen bonding, morphology, bond strengths, polarity and any combination thereof.

4. The article of claim 3, wherein the fully activated thermosetting adhesive layer forms a stronger adhesive bond with the first layer than the second layer.

5. The article of claim 1, wherein a primary component of the first layer and a primary component of the second layer differ in polarity.

6. The article of claim 5, wherein the primary component of the first layer is a polar polymer and the primary component of the second layer is a polymer that is less polar than the primary component of the first layer.

7. The article of claim 6, further comprising:
   (d) a cavity surrounded by the flocked layer; and
   (e) an insert positioned in registration with the cavity and in contact with one or both of the fully activated thermosetting and thermoplastic adhesive layers.

8. The article of claim 1, wherein the flock layer is permanently adhered to the fully activated thermosetting adhesive layer and wherein the thermoplastic adhesive layer is permanently adhered to the fully activated thermosetting adhesive layer.

9. The article of claim 1, wherein a first surface of the flock layer is adhered to a release adhesive, the release adhesive being adhered to a carrier sheet and a second surface of the flock layer is adhered to the fully activated thermosetting adhesive layer, wherein the second surface of the flock layer is in an opposing relationship with the first surface of the flock layer, and wherein each of the fully activated thermosetting, first layer and second layer are pre-formed, self-supporting solid films.

10. The article of claim 1, wherein at least one of the following is true for the fully activated thermosetting adhesive layer:
   (i) when heated, the fully activated thermosetting layer is more viscous than the thermoplastic adhesive layer; and
   (ii) the softening point of the fully activated thermosetting adhesive film is greater than the softening point of the thermoplastic adhesive layer.

11. The article of claim 1, wherein the first and second layers are co-extruded, wherein the first and second layers are substantially immiscible when melted, and wherein the first and second layers remain substantially permanently adhesively joined.

12. The article of claim 1, wherein the second layer of the thermoplastic layer is bonded to the substrate after removal of the sacrificial backing material.

13. The article of claim 1, wherein the fully activated thermosetting adhesive layer comprises one or more of polyethylene, polyamide, epoxide, polyurethane, phenolic, alkyd, amino resin, polyester, rubber, and silicone.

14. The article of claim 1, wherein a softening temperature of the fully activated thermosetting adhesive layer is higher than a softening temperature of the thermoplastic adhesive layer.

15. A flocked decorative article, comprising:
   (a) a flock layer comprising flock fibers;
   (b) a fully activated thermosetting adhesive layer comprising a curing agent, wherein the fully activated thermosetting adhesive layer comprises at least one of a polyethylene, polyamide, epoxide, polyurethane, phenolic, alkyd, amino resin, polyester, rubber, and silicone;
   (c) a thermoplastic adhesive layer having a first surface bonded to the fully activated thermosetting adhesive layer and a second surface opposed to the first surface, the fully activated thermosetting adhesive layer being positioned between the flock layer and the thermoplastic adhesive layer, wherein the fully activated thermosetting adhesive layer is fully activated when heated above an activation temperature, wherein the activation temperature of the fully activated thermosetting adhesive layer is higher than a softening temperature of the thermoplastic adhesive layer and wherein, when the flock layer, fully activated thermosetting adhesive layer, and thermoplastic adhesive layer are subsequently heated and the thermoplastic adhesive layer adhered permanently to a substrate, the curing agent is substantially immobilized in the fully activated thermosetting adhesive layer, wherein the thermoplastic adhesive layer comprises first and second layers differing in one or both of chemical and physical adhesion properties, the fully activated thermosetting adhesive layer being positioned between the flock layer and the thermoplastic adhesive layer.

16. The article of claim 15, wherein the first layer of the thermoplastic adhesive layer is bonded to the thermosetting adhesive layer, and the thermoplastic adhesive layer and the first layer are positioned between the second layer and the fully activated thermosetting adhesive layer and wherein the first and second layers differ in one or more of mechanical adhesion, dispersive adhesion, chemisorption adhesion, electrostatic adhesion, diffusion adhesion, solubility parameter, melting temperature, softening point, viscosity, surface energy, degree of crystallinity, hydrogen bonding, morphology, bond strengths, polarity and any combination thereof and further comprising:

(d) a sacrificial backing material removably adhered to the second surface.

17. The article of claim 16, wherein the fully activated thermosetting adhesive layer forms a stronger adhesive bond with the first layer than the second layer.

18. The article of claim 15, wherein the first layer of the thermoplastic adhesive layer is bonded to the thermosetting adhesive layer, and the thermoplastic adhesive layer and the first layer are positioned between the second layer and the fully activated thermosetting adhesive layer and wherein a primary component of the first layer and a primary component of the second layer differ in polarity.

19. The article of claim 18, wherein the primary component of the first layer is a polar polymer and the primary component of the second layer is a polymer that is less polar than the primary component of the first layer.

20. The article of claim 15, wherein the flock layer is permanently adhered to the fully activated thermosetting adhesive layer; and wherein the thermoplastic adhesive layer is permanently adhered to the fully activated thermosetting adhesive layer.

21. The article of claim 20, further comprising:
(d) a cavity surrounded by the flocked layer; and
(e) an insert positioned in registration with the cavity and in contact with one or both of the fully activated thermosetting and thermoplastic adhesive layers.

22. The article of claim 15, wherein the first layer of the thermoplastic adhesive layer is bonded to the thermosetting adhesive layer, and the thermoplastic adhesive layer and the first layer are positioned between the second layer and the fully activated thermosetting adhesive layer, wherein a first surface of the flock layer is adhered to a release adhesive, the release adhesive being adhered to a carrier sheet and a second surface of the flock layer is adhered to the fully activated thermosetting adhesive layer, wherein the second surface of the flock layer is in an opposing relationship with the first surface of the flock layer, and wherein each of the fully activated thermosetting, first layer and second layer are preformed, self-supporting solid films.

23. The article of claim 15, wherein at least one of the following is true for the fully activated thermosetting adhesive layer:
(i) when heated the fully activated thermosetting layer is more viscous than the thermoplastic adhesive layer; and
(ii) the softening point of the fully activated thermosetting adhesive film is greater than the softening point of the thermoplastic adhesive layer.

24. The article of claim 15, wherein the first layer of the thermoplastic adhesive layer is bonded to the thermosetting adhesive layer, and the thermoplastic adhesive layer and the first layer are positioned between the second layer and the fully activated thermosetting adhesive layer, wherein the first and second layers are co-extruded, wherein the first and second layers are substantially immiscible when melted, and wherein the first and second layers remain substantially permanently adhesively joined.

25. The article of claim 15, wherein the first layer of the thermoplastic adhesive layer is bonded to the thermosetting adhesive layer, and the thermoplastic adhesive layer and the first layer are positioned between the second layer and the fully activated thermosetting adhesive layer and further comprising:
(f) the second layer of the thermoplastic layer is bonded to the substrate after removal of the sacrificial backing material.

26. The article of claim 15, wherein a softening temperature of the fully activated thermosetting adhesive layer is higher than a softening temperature of the thermoplastic adhesive layer.

* * * * *